(12) United States Patent
Utata

(10) Patent No.: US 10,989,176 B2
(45) Date of Patent: Apr. 27, 2021

(54) ROTARY POWER STORAGE AND REINFORCEMENT SYSTEM

(71) Applicant: Kunihiko Utata, Ichikawa (JP)

(72) Inventor: Kunihiko Utata, Ichikawa (JP)

(73) Assignee: Kunihiko UTATA, Ichikawa (JP)

( * ) Notice: Subject to any disclaimer, the term of this patent is extended or adjusted under 35 U.S.C. 154(b) by 0 days.

(21) Appl. No.: 16/804,368

(22) Filed: Feb. 28, 2020

(65) Prior Publication Data

US 2020/0248677 A1    Aug. 6, 2020

Related U.S. Application Data

(63) Continuation of application No. PCT/JP2019/018878, filed on May 13, 2019.

(30) Foreign Application Priority Data

Aug. 21, 2018 (JP) .............................. JP2018-154944

(51) Int. Cl.
  *F03G 1/02* (2006.01)
  *F03G 1/08* (2006.01)
  (Continued)

(52) U.S. Cl.
  CPC ................. *F03G 1/02* (2013.01); *F03G 1/08* (2013.01); *H02K 7/1853* (2013.01); *B62M 6/80* (2013.01); *F16D 41/00* (2013.01)

(58) Field of Classification Search
  CPC ............ F03G 1/02; F03G 1/08; H02K 7/1853
  See application file for complete search history.

(56) References Cited

U.S. PATENT DOCUMENTS 9,168,821 B1    10/2015 Pritchard et al.
2018/0304963 A1*   10/2018 Howe ...................... B62M 1/36

FOREIGN PATENT DOCUMENTS

CN    2556383 Y    6/2003
CN    2842000 Y    11/2006
(Continued)

OTHER PUBLICATIONS

International Search report and Written Opinion of the International Searching Authority dated Jun. 11, 2019 for PCT Application No. PCT/JP2019/018878.
(Continued)

*Primary Examiner* — Viet P Nguyen
(74) *Attorney, Agent, or Firm* — EIP US LLP

(57) ABSTRACT

The objective is to realize a rotation storage device with a lightweight and straightforward configuration that can release the energy of various urging means, typically a flat coil spring, over a more extended period and increase the urging force. The rotation storage device includes a plurality of single unit rotation storage devices that comprise of an urging means for urging of the rotational force and a one-way bearing with one end of the urging means fixed to one of its outer ring or inner ring, wherein a plurality of single unit rotation storage devices are characterized in that the outer ring and inner ring of the one-way bearings are connected, the other end of the urging means connected to one end of the urging means of the adjacent unit rotation storage device, and the rotation force is output between the outer ring and inner ring of the one-way bearing.

23 Claims, 12 Drawing Sheets

(51) Int. Cl.
*H02K 7/18* (2006.01)
*B62M 6/80* (2010.01)
*F16D 41/00* (2006.01)

(56) References Cited

FOREIGN PATENT DOCUMENTS

| | | | |
|---|---|---|---|
| CN | 103573952 A * | 2/2014 | ............... F03G 1/02 |
| DE | 102005047629 A1 | 4/2007 | |
| DE | 102008024829 A1 | 11/2009 | |
| DE | 102015217248 A1 | 3/2016 | |
| JP | 47-022236 A | 10/1972 | |
| JP | 07269620 A | 10/1995 | |
| JP | 1995-269620 A | 4/1997 | |
| JP | 9-257069 A | 9/1997 | |
| JP | 2012102717 A | 5/2012 | |

OTHER PUBLICATIONS

German Office Action dated Nov. 4, 2020 for DE Application No. 112019000114.0.
Chinese Office Action and Search report dated Aug. 28, 2020 for Chinese application No. 201980004842.5.

* cited by examiner

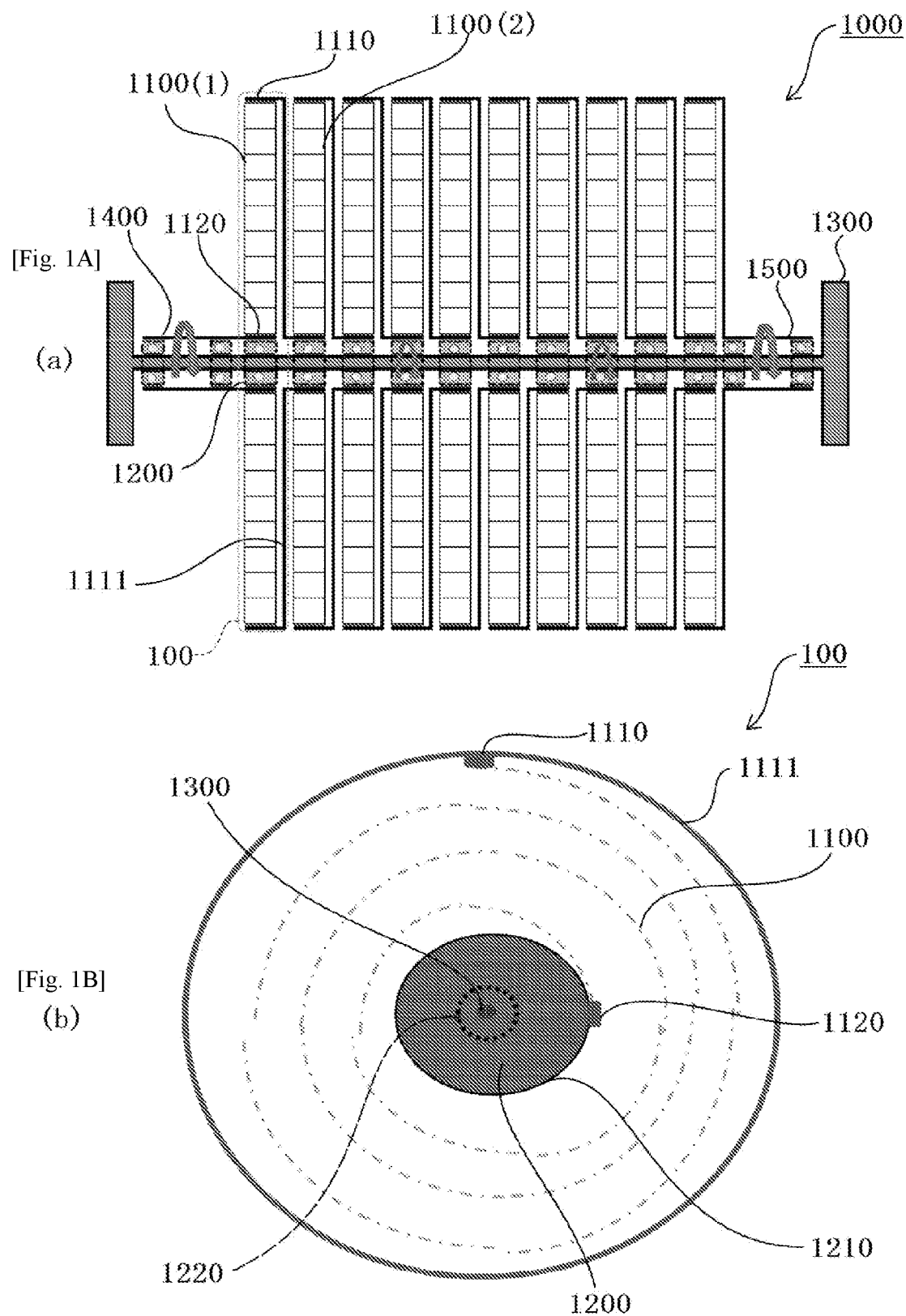

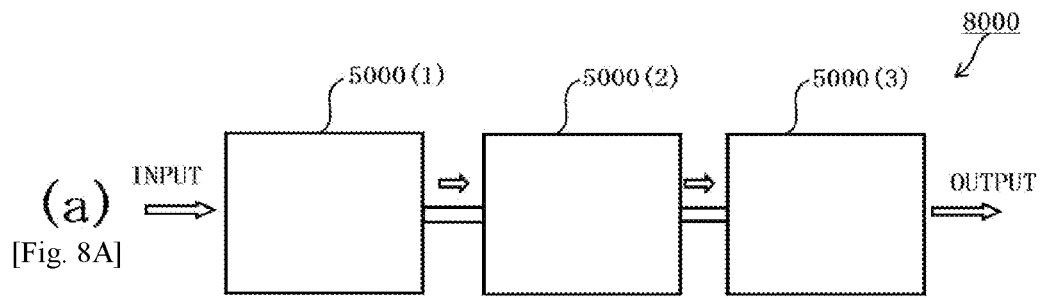
(a) [Fig. 8A]
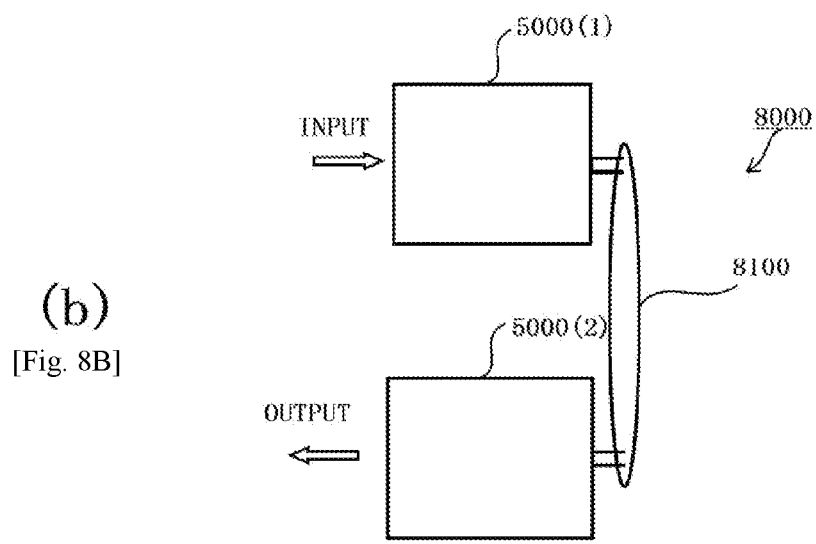
(b) [Fig. 8B]
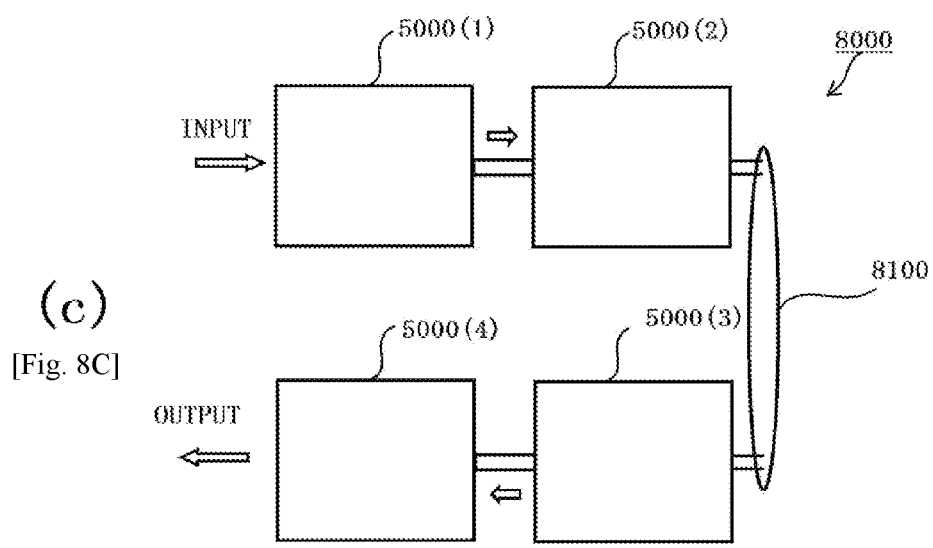
(c) [Fig. 8C]

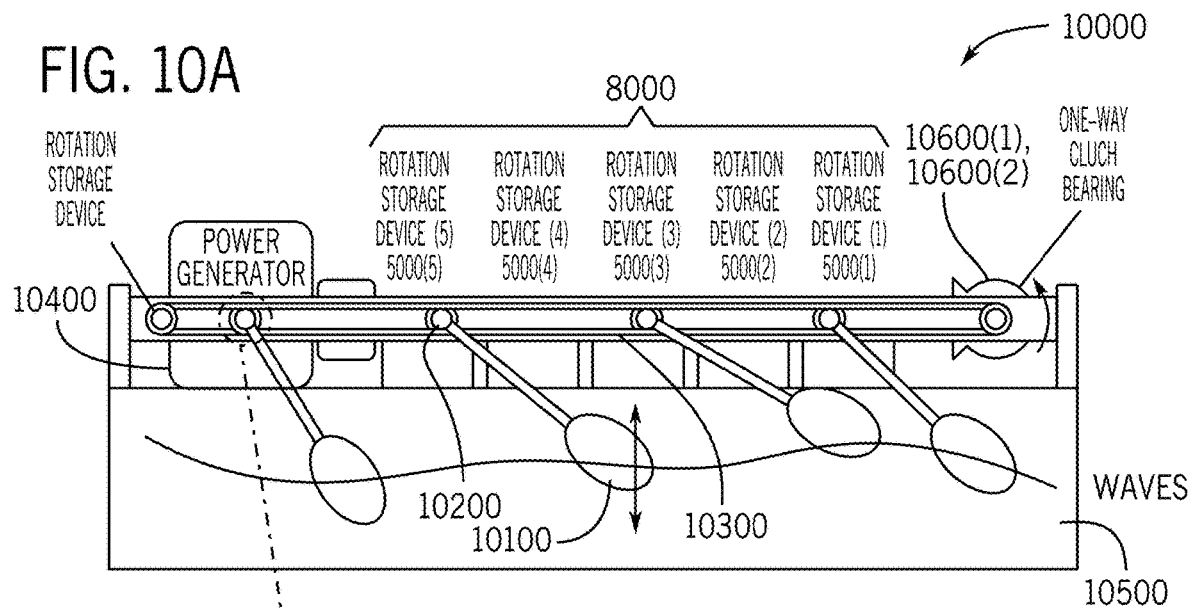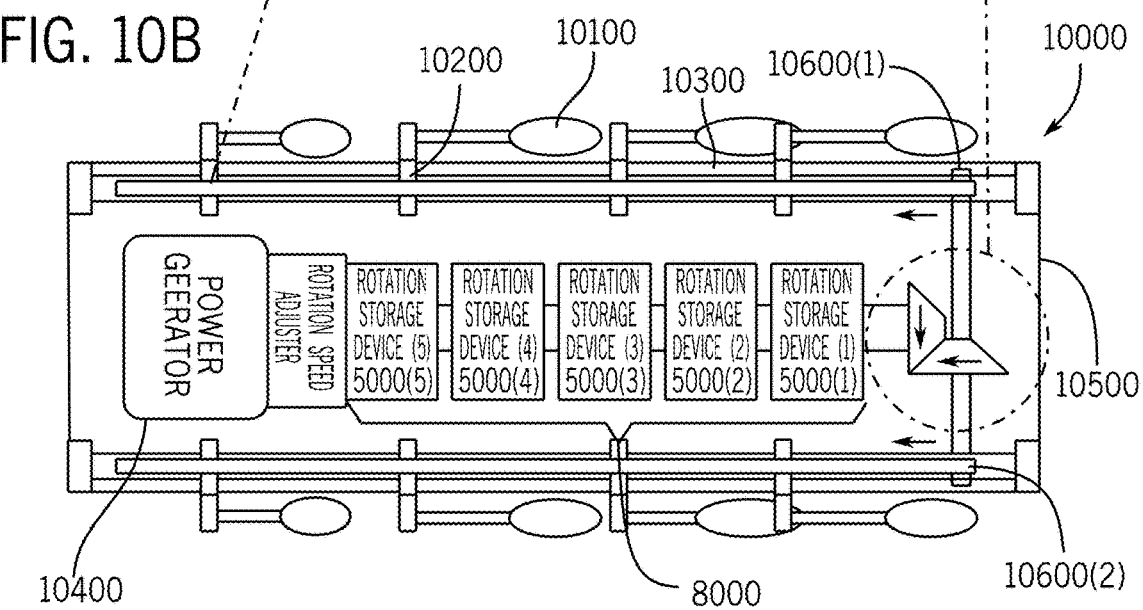

ROTARY POWER STORAGE AND REINFORCEMENT SYSTEM

CROSS-REFERENCE TO RELATED APPLICATIONS

This application is a continuation of International Application No. PCT/JP2019/018878, filed May 13, 2019 which claims priority to Japanese Application No. 2018-154944 filed Aug. 21, 2018. Each of the above-referenced patent applications is incorporated by reference in its entirety.

BACKGROUND OF THE INVENTION

Field of the Invention

The present invention relates to a rotation storage device that can store as well as release a higher amount of energy.

Description of the Related Technology

Conventionally, a flat coil spring is known as a mechanical configuration that generates mechanical power, especially rotational torque. Flat coil springs were extensively used as a relatively inexpensive and lightweight power storage source for toys, watches, music boxes, figurines, etc. with moving parts, until the recent popularization of electric and electronic motors. However, as the use of a lightweight and compact electric energy sources such as secondary batteries became widespread because of the popularization of electric motors, the flat coil spring was gradually replaced with electric power, and today it is not easy to find products that use flat coil springs, except for antiques and some artifacts, etc.

Here, patent document 1 (Japanese Published Unexamined Application No. 1995-269620 (official)) discloses an invention wherein the energy stored in a flat coil spring is increased as much as possible while preventing the flat coil spring from being wound beyond its limit, and obtaining a flat coil spring mechanism that enables overrun while preserving the energy when the flat coil spring is wound beyond the limit is taken as the problem to be solved. Further, obtaining an ideal flat coil spring mechanism in which the outer end of the flat coil spring disengages from the internal surface of the housing of the flat coil spring after the diameter of the flat coil spring decreases from the inner end, and gradually decreases towards the outer end of the flat coil spring as it is wound, and sufficient energy is stored in the flat coil spring, is described as a specific technical problem.

In the flat coil spring mechanism of patent document 1, wherein the inner end of the flat coil spring of spiral shape is connected to the input/output member, and the outer end of the flat coil spring is engaged with the inner peripheral surface of the flat coil spring casing through the engagement projection and recession section, the outer end will disengage from the engagement projection and recession section due to decreasing diameter of the flat coil spring when the flat coil spring is wound beyond its winding limit and re-engaged as a larger diameter is regained due to unwinding, and the rigidity of the inner side of the winding diameter of the flat coil spring is small and rigidity of the outer side is high.

SUMMARY

Technical Problem

However, the most significant disadvantage of such a mechanical spring is that the continuous operation duration is significantly restricted and short compared to an electric motor. It is self-evident that an electric motor can continue to operate for a very long time as long as electric power is supplied, excluding failures and product service life. On the other hand, various springs, typically flat coil springs, have a mechanism in which the energy stored with reverse rotation by human power, and the like, is released slowly over a certain period, due to which the duration of operation is significantly short and reverse rotation for restoring energy through rewinding and the like, is necessary after energy has been released.

In the case of an electric motor, a large capacity of electric power to be supplied can be stored in secondary batteries or various batteries and the like, as electrochemical energy converted from electric energy. In the case of a flat coil spring, the energy of the spring, which is a repulsive mechanical force, is stored mechanically by keeping the spring stationery. Therefore, the stored energy is inevitably smaller compared to electricity. However, in today's world, when various concerns about mass consumption of fossil fuels have been significantly highlighted, and energy-saving and natural energy are attracting attention, if a large amount of energy can be stored mechanically and released appropriately, then extensive deployment of its application can be expected.

The present invention is made because of the problems mentioned above and aims at providing a rotation storage device with a relatively lightweight and straightforward configuration that can release the energy of various urging means, typically a flat coil spring, over a more extended period and increase the urging force. Also, the present invention aims at providing a rotation storage device and the like, which stores and releases a higher amount of energy.

Solution to the Problem

The rotation storage device of the present invention is characterized by the inclusion of a plurality of single unit rotation storage devices that comprise of an urging means for rotational force urging, and a one-way bearing with one end of the urging means fixed to one of its outer ring or inner ring, wherein the plurality of single unit rotation storage devices are characterized in that the outer ring and inner ring of the one-way bearings are connected, the other end of the urging means connected to one end of the urging means of the adjacent single unit rotation storage device, and the rotational force is output between the outer ring and inner ring of the one-way bearing The rotation storage device of the present invention is preferably characterized in that a plurality of single unit rotation storage devices are continuously arranged to be coaxial.

The rotation storage device of the present invention is more preferably characterized in that the urging means is a spring.

The rotation storage device of the present invention is more preferably characterized in that the spring is a flat coil spring.

The rotation storage device of the present invention is more preferably characterized in that each urging means of the plurality of single unit rotation storage devices is an urging means for gradually increasing the rotational force to the output.

The rotation storage device of the present invention is more preferably characterized in that each urging means of the plurality of single unit rotation storage devices is an urging means having the same characteristics.

The rotation storage device of the present invention is more preferably characterized in that the duration for which the rotation storage device can output the rotational force continuously is longer than the period for which a single unit rotation storage device can output the rotational force continuously.

The rotation storage device of the present invention is more preferably characterized in that one end of the urging means is connected to the outer ring of the one-way bearing, and the shaft rod is connected to the inner ring of the one-way bearing.

The rotation storage device of the present invention is more preferably characterized in that the shaft rod is fixed so that it cannot rotate, and the outer ring of the one-way bearing outputs the rotational force.

The power generator of the present invention is characterized in that it comprises the above-mentioned rotation storage device.

The power generator of the present invention is preferably characterized in that it is a wind-activated power generator.

The bicycle of the present invention is characterized in that it comprises the rotation storage device described above.

Advantageous Effects of the Invention

A rotation storage device with a relatively lightweight and straightforward configuration can be realized that can release the energy of various urging means, typically a flat coil spring, over a more extended period and increase the urging force.

BRIEF DESCRIPTION OF THE DRAWINGS

FIG. 1(a) is a side view to illustrate the schematic configuration example of the rotation storage device according to the first embodiment, and FIG. 1(b) is the front schematic view to explain the configuration of a single unit rotation storage device that constitutes the rotation storage device according to the first embodiment.

FIGS. 8(a)-8(c) are diagrams to illustrate a rotation storage apparatus which a plurality of rotation storage devices, shown in FIG. 5, are connected, and to illustrate the variation of the connection configuration form, which enables a higher rotation output and rotation output over a more extended period.

FIGS. 10(a), 10(b) are diagrams to illustrate the schematic configuration of a wave activated power generation system according to an embodiment equipped with the rotation storage apparatus described above.

DETAILED DESCRIPTION OF CERTAIN INVENTIVE EMBODIMENTS

Figure 2A:
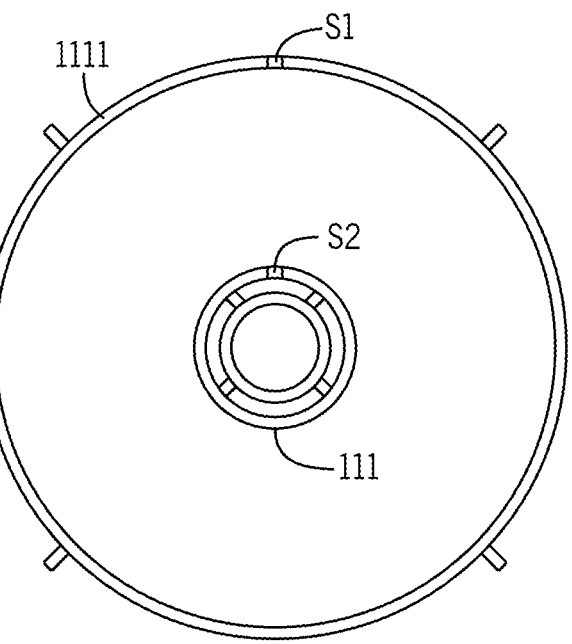
FIGS. 2(a)-2(c) are schematic diagrams to explain the configuration of a single unit rotation storage device according to the first embodiment.

The rotation storage device described in the present embodiment includes a plurality of units, each unit structure consists of an urging means such as a flat coil spring or other spring or an elastic body such as rubber that outputs rotational force connected to a one-way bearing. By increasing the number of such urging means that are connected, the rotational force can be further increased (amplified) or the continuous duration of rotation output can be further increased.

Specifically, if 10 springs having the same characteristics are connected, for example, a rotation output duration that is 10 times a single spring can be obtained, and if the structure has springs with gradually (stepwise) increasing output connected towards the output, a larger rotational force with the amplification of the rotational force of each spring can be output.

One-way bearings are sometimes referred to as one-way clutches or free holes and can transmit rotational force in one particular direction only. The one-way bearing is equipped with a structure for transmitting torque in one direction between the inner and outer rings of the same shaft. The present embodiment will be described in detail based on the drawings.

First Embodiment

FIG. 1(a) is a side view to illustrate the schematic configuration example of rotation storage device 1000 according to the first embodiment, and FIG. 1(b) is the front schematic view to illustrate the configuration of a single unit rotation storage device 100 that constitutes rotation storage device 1000 according to the first embodiment. In FIG. 10(a), rotation storage device 1000 is configured by connecting 10 single unit rotation storage devices 100 as an example, and each single unit rotation storage device 100 is provided with a flat coil spring 1100 having the same characteristics.

As shown in FIGS. 1(a), 1(b) rotation storage device 1000 is configured such that the inner end 1120 of flat coil spring 1100(1) of the single unit rotation storage device 100 is fixed to the outer ring 1210 of the one-way bearing 1200, and outer end 1110 of the flat coil spring 1100(1) is fixed to the inner end of the adjacent flat coil spring 1100(2) through housing 1111.

Since each single unit rotation storage device 100 has the same configuration, that is, the outer end 1110 of each spiral spring 1100 is fixed to the inner end 1120 of each flat coil spring 1100 arranged adjacent towards the output, and the inner end 1120 of each of the flat coil spring 1100 is fixed to the outer ring of a one-way bearing 1200 provided in each of the flat coil spring.

In addition, as shown in FIG. 1(*a*), the one-way bearing 1200 of each single unit rotation storage device 100 is fixed to a shaft rod 1300, respectively. With such a configuration, for example, in the state where each flat coil spring 1100 is wound by rotating the rotation input end 1400 and fixing the shaft rod 1300 to be non-rotatable, it is possible to output a rotational force that is even larger (typically 10 times) than a single unit rotation storage device 100 to the rotation output end 1500. Also, the duration of rotation output can be longer than a single unit rotation storage device 100 (typically 10 times).

The one-way bearing 1200 can output a rotational force relatively in one direction between the inner ring and outer ring by the energy of a spring. Assuming that in the state where each flat coil spring 1100 is wound by rotating the input end 1400, the rotation input end 1400 and/or the rotation output end 1500 are fixed so as not to rotate, it is possible to adopt a configuration in which the shaft rod 1300 is rotated contrary to the case described above.

As can be understood from FIG. 1(*b*), the outer end 1110 of flat coil spring 1100 is fixed to the outer side of the inner wall of housing 1111, and the inner end 1120 of flat coil spring 1100 is fixed to the outer ring 1210 of the one-way bearing 1200. Further, it is assumed that the inner ring 1220 of one-way bearing 1200 is fixed to shaft rod 1300.

In FIGS. 1(*a*), 1(*b*), shaft rod 1300 passes through a total of 10 units of single unit rotation storage device 100, and inner rings 1220 of 10 one-way bearing 1200, are respectively fixed to shaft rod 1300. Note that, in FIG. 1(*b*), a gap is shown between inner ring 1220 and shaft rod 1300 for convenience of explanation, but a fixing method between them may be configured to have the same diameter and fixed with close contact by adhesive, welding, or the like, or may mechanically engaged and fixed using a gear, a gear structure, or the like.

This fixing method is also used to fix outer ring 1220 and inner end 1120. In FIG. 1(*a*), the one-way bearing disposed on the outermost sides of shaft rod 1300 may be formed of an ordinary (two way) bearing but preferably a one-way bearing from the viewpoint of further improving the mechanical strength related to the transmission of the rotational force.

Figure 2B:
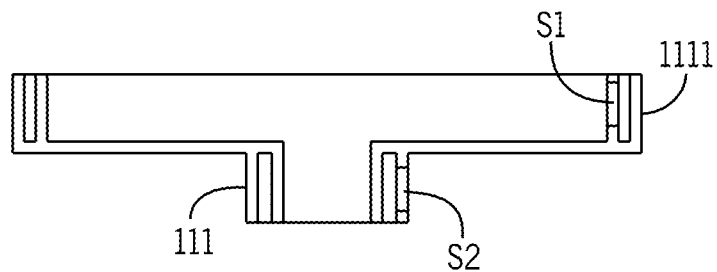
Figure 2C:
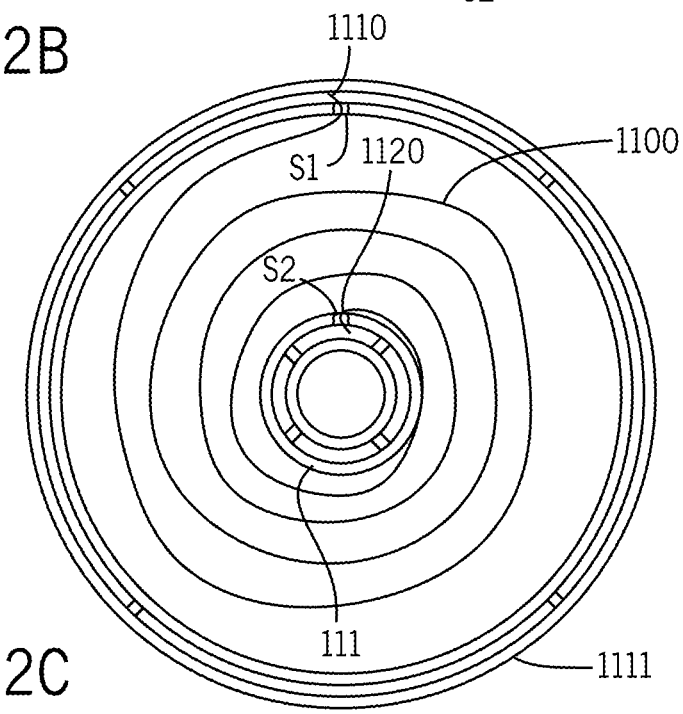
Figures 3A, 3B:
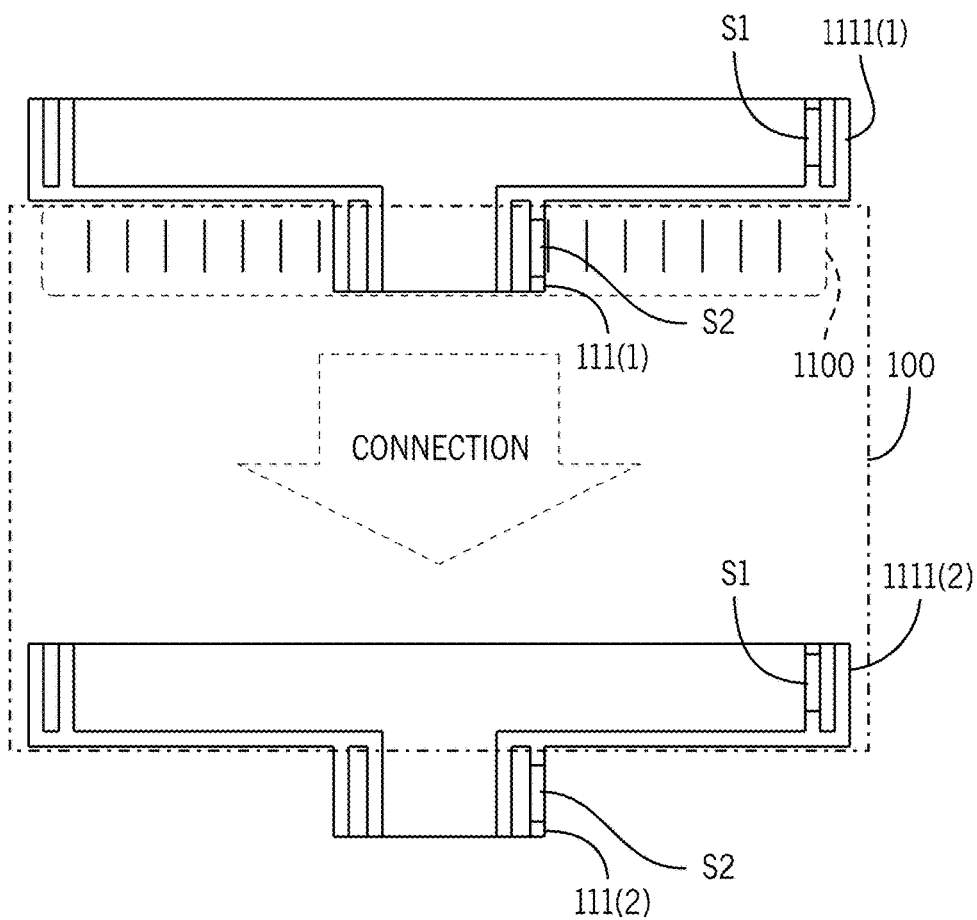
FIGS. 3(a), 3(b) are schematic diagrams to explain the configuration of a single unit rotation storage device according to the first embodiment.

FIGS. 2(*a*)-2(*c*) and FIGS. 3(*a*), 3(*b*) are schematic diagrams to explain the configuration of a single unit rotation storage device 100 according to the first embodiment. FIGS. 2(*a*)-2(*c*) and FIGS. 3(*a*), 3(*b*) shows the state in which the housing of the single unit rotation storage device 100 shown in FIGS. 1(*a*), 1(*b*) is opened to expose the flat coil spring 1100, the one-way bearing and shaft rod are omitted for the convenience of explanation. In FIG. 2, outer end 1110 of the flat coil spring 1100 is fixed to slit hole S1 on the inner wall of the outer periphery of housing 1111. Further, the inner end 1120 of flat coil spring 1100 is fixed to slit hole S2 of cylindrical member 111. For fixing to slit hole S1 or slit hole S2 as shown in the figure, after inserting the ends of the flat coil spring 1100 into the respective holes, the ends are preferably bent so as not to be removed.

As can be understood from FIGS. 3(*a*), 3(*b*), cylindrical member 111(1) and housing 1111(2) forming a space for holding and accommodating a single flat coil spring 1100 are physically connected only through the flat coil spring 1100. In FIGS. 3(*a*), 3(*b*), cylindrical member 111 is integrally connected and fixed (or integrally molded) with housing 1111(1) of FIG. 3(*a*), and housing 1111(1) is integrally connected and fixed (or integrally molded) with cylindrical member 111(1) of the single unit rotation storage device 100. Here, in FIGS. 3(*a*), 3(*b*), each of the components shown in FIG. 3(*a*) and FIG. 3(*b*) are rotating components which are separately and independently rotatable relative to a shaft rod that is not shown in the state shown in FIGS. 3(*a*), 3(*b*).

In other words, in FIGS. 2(*a*)-2(*c*) and FIGS. 3(*a*), 3(*b*), if you focus on one flat coil spring 1100 that has been wound, inner end 1120 and outer end 1110 of the flat coil spring 1100 have a rotational force in opposite rotational directions with respect to the spring center, and both ends will respectively urge the outer ring of the adjacent one-way bearing with the rotational force in the opposite direction.

More specifically, in FIGS. 3(*a*), 3(*b*), inner end 1120 attempts to urge the rotational force to the outer ring of the one-way bearing through cylindrical member 111(1), and outer end 1110 attempts to urge the reverse rotational force to the outer ring of the one-way bearing of the adjacent single unit rotation storage device through housing 1111(2) to which it is locked and cylindrical member 111(2) which is connected and fixed to housing 1111(2) (or integrally molded).

Then, one of the rotational forces of different directions imparted from one spring to the adjacent outer ring is not transmitted to the inner ring based on the characteristics of the one-way bearing and is blocked. Due to the action mechanism by the inclusion of such a one-way bearing, a single flat coil spring 1100 can output a rotational force only in one specific direction with respect to the shaft rod.

Since the rotational force which is urged between the inner ring and outer ring of the bearing is relative, it is possible to have a relationship in which, if either one of the inner and outer rings is fixed so as not to be rotatable, a rotational force is output to the other. Therefore, shaft rod 1300 and rotation input end 1400 of the present embodiment may also have such a relationship.

Other Embodiments

Figure 4A:
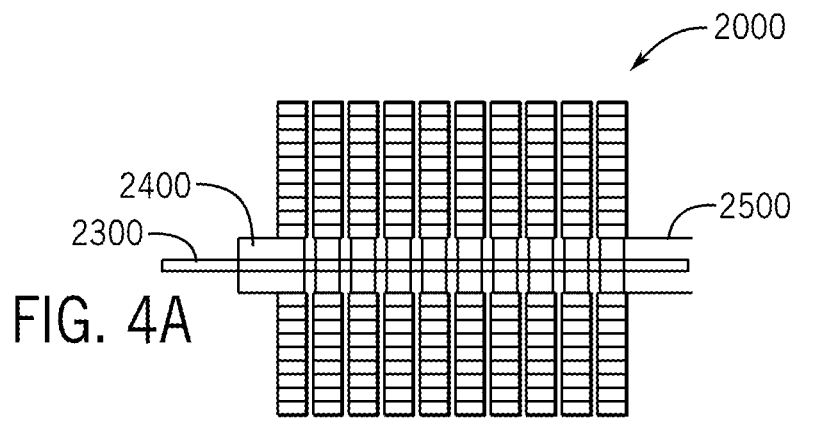
FIGS. 4(a)-4(c) are schematic diagrams to illustrate a different embodiment.
Figure 4B:
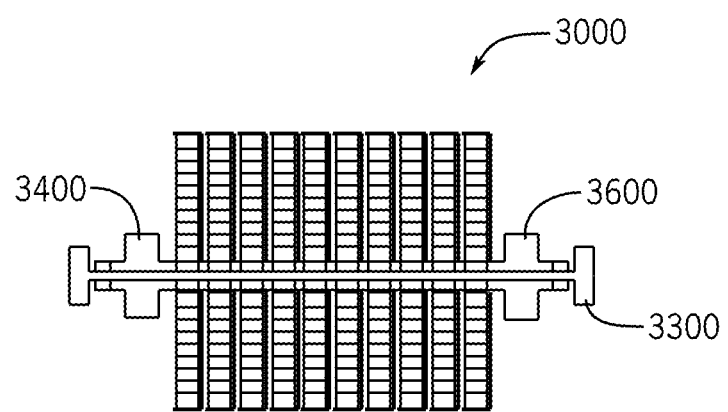

FIGS. 4(*a*)-4(*c*) are schematic diagrams illustrating another embodiment. FIG. 4(*a*) shows the rotation storage device 2000 according to the second embodiment, wherein the rotation input end 2400 is configured as a large common bearing with the one-way bearing of the single unit rotation storage device at the left end of the figure. Also, shaft rod 2300 need not necessarily be a single rod passing through the shaft center, and for example, the inner ring of each one-way bearing of each single unit rotation storage device may be non-rotatably locked to a housing case that holds and accommodates rotation storage device 2000. As shown in FIG. 4(*a*), the rotation output end 2500 may be configured not to be connected to shaft rod 2300 or the like by a bearing, and the shape, diameter, size or the like may be arbitrary so that the rotational force can be output from the outer end or the like of the rightmost flat coil spring.

FIG. 4(*b*) shows rotation storage device 3000 according to the third embodiment, wherein the diameter of the rotation input end 3400 and rotation output end 3500 is larger than the outer ring of the one-way bearing. Of course, either or both of the rotation input end 3400 and rotation output end 3500 may be a gear or an optional gear configuration. Further, shaft rod 3300 may be fixed to the housing case or the like of rotation storage device 3000 so as not to be rotatable. On the other hand, when the rotation output end 3500 is fixed to the housing case or the like, the shaft rod 3300 outputs a rotational force. For example, by rotating the rotation input end 3400, it is possible to store the rotation force again even if the rotational force is released and depleted. Also, it is possible to interchange the rotation input end 3400 and rotation output end 3500 with each other.

Figure 4C:
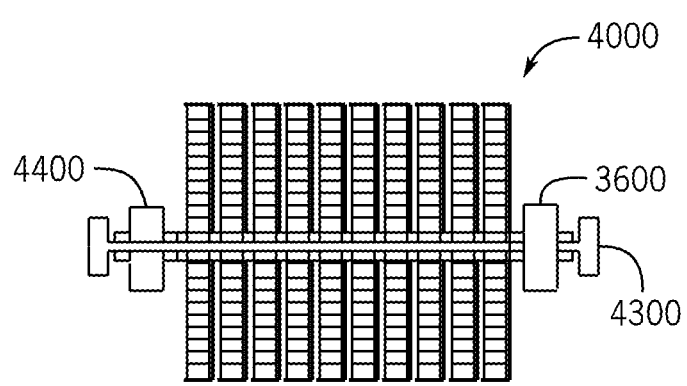

Further, FIG. 4(c) shows rotation storage device 4000 according to the fourth embodiment, wherein the rotation input end 4400 and rotation output end 4500 are supported by two bearings with respect to shaft rod 4300. With such a configuration, it is preferable to increase the mechanical strength of rotation input end 4400 and rotation output end 4500 so as to increase the durability and reliability even when the force is applied in various directions.

The rotation storage device of the present invention described above can be applied to machines and devices that store, output and use rotational force such as wind-activated power generator and bicycle, or the like. For example, since the wind-activated power generator uses natural energy, it is difficult to maintain a constant power generation as the wind is sometimes strong and sometimes weak, but it is also possible to mechanically smooth the power generation by winding the spring of the rotation storage device of the present invention to store the rotational force when the wind is strong and outputting this power when the wind is weak. Further, in a bicycle, when traveling on a downhill slope or a flat road, it is possible to store the rotational force by winding the spring of the rotation storage device of this application and outputting the stored rotational force to use as a mechanical assist function when a large torque is required such as during start or climbing a slope. This invention can be applied to various machines and instruments using other motors and rotations, and an explanation is not required.

Description of Application Development Embodiment

Rotation Storage Apparatus and its Connection Mode

Figure 5:
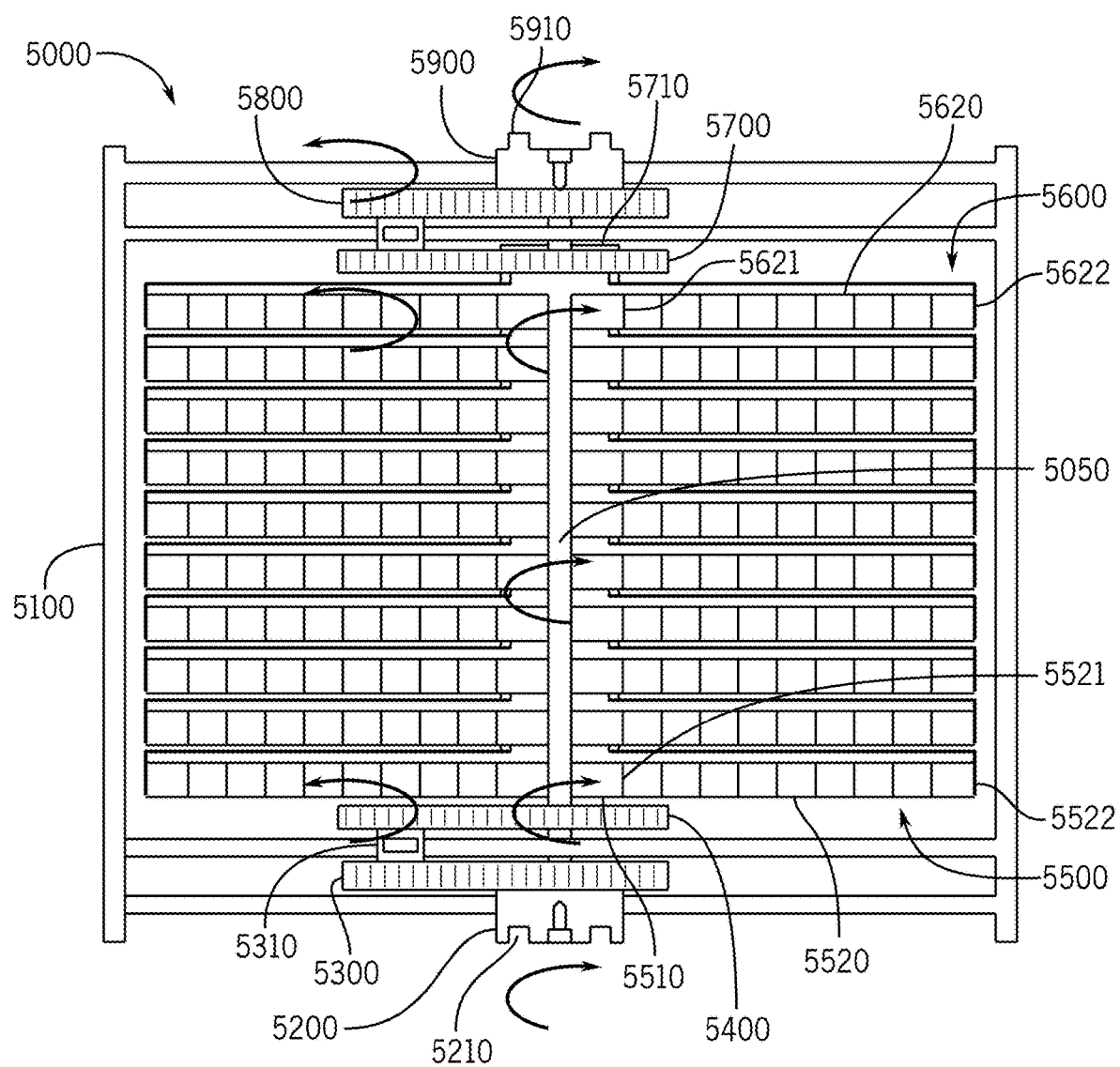
FIG. 5 is a side view to illustrate the schematic configuration in which the rotation storage device is held in the housing such that it is simple to connect a plurality of units, and the rotational force generated inside the rotation storage device is simple to take out.
Figure 6A:
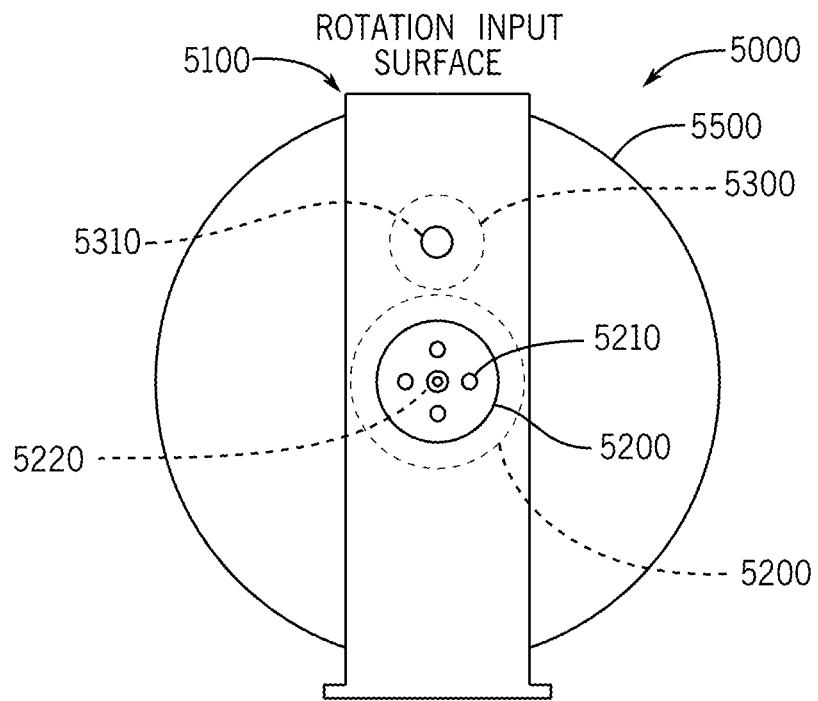
FIG. 6(a) is a left side view to illustrate the rotation input surface of the rotation storage apparatus.
Figure 6B:
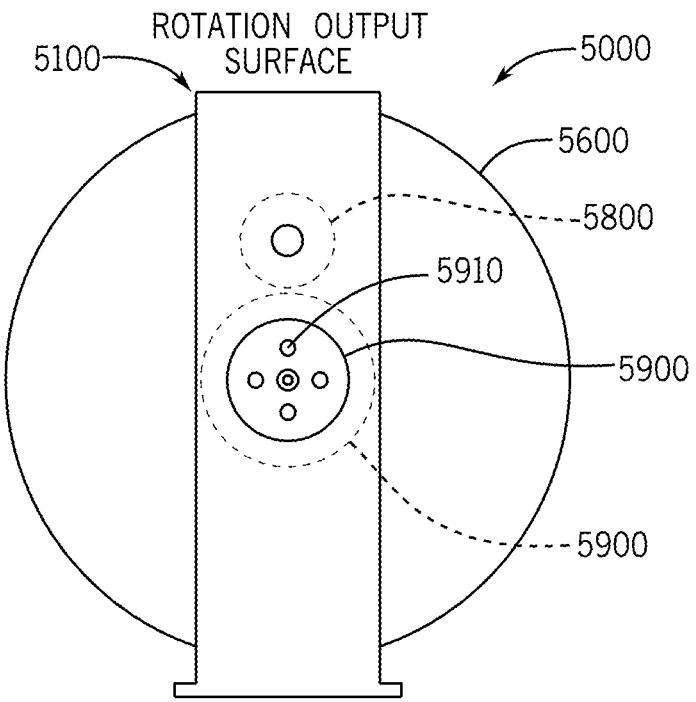
FIG. 6(b) is a right-side view to explain the rotation output surface of the rotation storage apparatus.

FIG. 5 is a side view illustrating the schematic configuration in which the rotation storage device described above is held in the housing such that it is simple to connect a plurality of units, and the rotational force generated inside the rotation storage device 5000 is simple to take out. FIG. 6(a) is a left side view to illustrate the rotational input surface of rotation storage device 5000, and FIG. 6(b) is a right-side view to illustrate the rotational output surface of rotation storage device 5000. In FIG. 5, for the convenience of explanation, a partially transparent cross-sectional configuration is shown, since the configuration of the rotation storage device has already been described, a detailed description of the rotation storage device is omitted.

As illustrated in FIG. 5, rotation storage device 5000 is equipped with housing 5100 and a plurality of single unit rotation storage devices housed inside the housing 5100. The shaft center rod 5050 of the rotation storage device is fixed to the left and right inner walls of housing 5100 and cannot rotate. To explain from the rotation input side, in FIG. 5, the first rotation input gear 5200 protrudes from the center of the left outer wall of housing 5100 at the input end on the left side of the drawing, and the tip of the first rotation input gear 5200 is provided with a plurality of engaging recesses 5210. Engaging recess 5210 is engaged and connected to an engaging protrusion (details will be described later) of another rotation storage device 5000 connected adjacently and has the function of transmitting a rotational force.

Figure 7A:
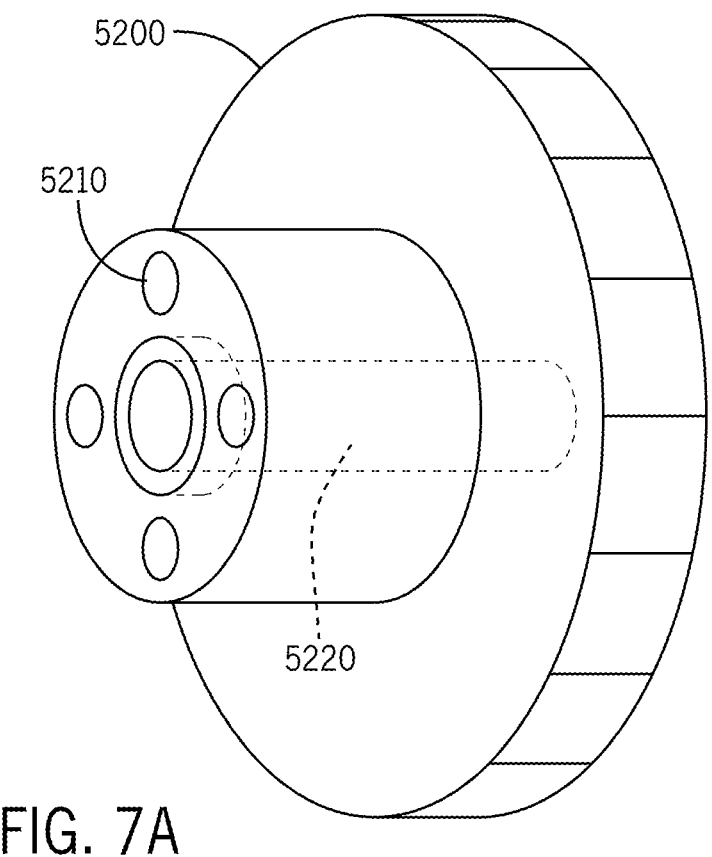
FIG. 7(a) is a diagram to illustrate the schematic configuration of the rotation input gear.
Figure 7B:
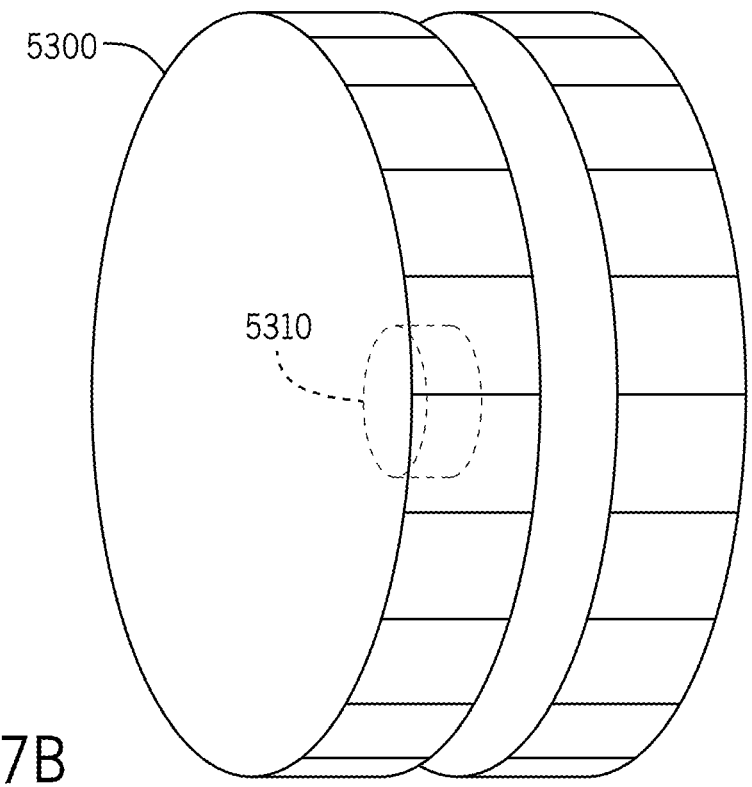
FIG. 7(b) is a diagram to illustrate the schematic configuration of the transmission gear.

The first rotation input gear 5200 is provided with a gear as shown in FIG. 7(a), and is rotatably supported by a fixed shaft 5220 on the left inner wall of housing 5100 such that it is rotatable and coaxial with shaft center rod 5050. The gear of the first rotation input gear 5200 is arranged to engage with the outer ring of transmission gear 5300 which is H-shaped in the side view, and inner ring of transmission gear 5300 is engaged by meshing with the second rotation input gear 5400 that is disposed so as to be rotatable about the shaft center rod 5050. Rotation shaft 5310 of transmission gear 5300 is rotatably supported on the left inner wall of housing 5100. The schematic configuration of transmission gear 5300 is illustrated in FIG. 7(b). FIG. 7(a) is a diagram to illustrate the schematic configuration of the first rotation input gear 5200, and FIG. 7(b) is a diagram to illustrate the schematic configuration of transmission gear 5300.

The second rotation input gear 5400 is configured to allow input rotation to the single unit rotation storage device 5500 at the input end. That is, when the second rotation input gear 5400 receives the input from transmission gear 5300 and rotates about shaft center rod 5050, the second rotation input gear 5400 is fixed by meshing with the inner end 5521 such that the inner end 5521 of flat coil spring 5520 of the single unit rotation storage device 5500 rotates together to store the rotational force.

As already described in detail above, the inner end 5521 of the single unit rotation storage device 5500 on the input end and outer ring 5510 of the one-way bearing are fixed such that the rotation is the same, and the inner ring of one-way bearing is fixed to shaft center rod 5050 and is not rotatable. The outer end 5522 of flat coil spring 5520 of the single unit rotation storage device 5500 on the input end is connected to the inner end of the flat coil spring of the single unit rotation storage device which is disposed of adjacently and to which the rotational input is transmitted next.

On the rotation output side of the rotation storage device 5000, the output configuration and rotational force transmission can be approximately opposite to those on the input side. In other words, the outer end 5622 of flat coil spring 5620 of the single unit rotation storage device 5600 on the output end provides rotational output to the outer ring of the one-way bearing 5710 for output and second rotation output gear 5700 fixed to the outer ring of the one-way bearing 5710 for output.

The rotational force of the second rotation output gear 5700 is transmitted to the first rotation output gear 5900 through transmission gear 5800, and the rotational force can be taken to the outside of the right outer wall of housing 5100. The configuration of transmission gear 5800 is the same as that of the transmission gear 5300 shown in FIG. 7(b). Also, the configuration of the first rotation output gear 5900 is the same as the configuration of the first rotation input gear 5200 shown in FIG. 7(a) except that engaging protrusion 5910 is provided instead of engaging recess 5210. Further, as already described, inner end 5621 of flat coil spring 5620 of the single unit rotation storage device 5600 on the output end is fixed to the outer end of other single unit rotation storage devices disposed adjacent to each other such that the rotation is the same.

Next, FIGS. 8(a)-8(c) are diagrams to illustrate a rotation storage apparatus 8000 in which a plurality of rotation storage devices 5000, shown in FIG. 5, are connected, and to illustrate the variation of the connection configuration form which enables a higher rotation output and rotation output over a longer period. Rotation storage device 5000 has a straightforward configuration to store external rotational force from an urging means such as a flat coil spring disposed inside the rotation storage device and to take out the stored rotational force to the outside. Therefore, it is simple to connect any number of units in series, disposed and connected in parallel, or connected in any combination of series and parallel.

Rotation storage devices 5000(1), 5000(2), 5000(3) are connected serially in the embodiment shown in FIG. 8(a). If the flat coil spring of rotation storage device 5000(2) are made thicker than rotation storage device 5000(1), and the flat coil spring of rotation storage device 5000(3) are made thicker than rotation storage device 5000(2), then it is possible to output a larger rotational force than the initial input finally.

Also, if the rotation of each flat coil spring of rotation storage device 5000(2) is configured to be less than rotation storage device 5000(1) (for example, such that 10 rotations of rotation storage device 5000(1) is 5 rotations of 5000(2)), if the rotation of each flat coil spring of rotation storage device 5000(3) is configured to be less than rotation storage device 5000(2) (for example, such that 5 rotations of rotation storage device 5000(32) is 1 rotation of 5000(3)), 100 rotations can be stored compared to when rotation storage device 5000(1) is used alone, and a large amount of rotational energy can be stored for a longer time. For this reason, for example, any converter or gear, which adjusts and changes the rotation ratio or torque, may be provided at the connectors of rotation storage devices 5000(1), 5000(2), 5000(3), and input/output end of rotation storage apparatus 8000, etc.

In the embodiment shown in FIG. 8(b), rotation storage device 5000(1), 5000(2) are disposed and connected in parallel. As shown in FIG. 8(b), the output end of rotation storage device 500(1) and the input end of rotation storage device 5000(2) can be connected with any connector jig 8100, which are known to be capable of transmitting the rotational force of a belt, chain or gear, etc. The connector jig 8100 may have a function that can adjust and change the rotation ratio or rotational torque, and the like, and the rotational force may be stronger and/or the rotation time may be longer for the urging means of rotation storage device 5000(1) compared to rotation storage device 5000(2). For example, rotation storage device 5000(2) may be configured to have a flat coil spring that is thicker than rotation storage device 5000(1). In the embodiment shown in FIG. 8(c), rotation storage device 5000(1), 5000(2) are connected serially, 5000(3), 5000(4) are connected serially, and both sets are disposed in parallel. In the embodiment described above, both series and parallel arrangement are the same in terms of transmitting the rotational force between a plurality of rotation storage devices and enables a larger amount of rotational energy to be stored by using a plurality of rotation storage devices. Although not shown in FIGS. 8(a)-8(c), the rotational force of input may be divided and input to a plurality of rotation storage devices connected in parallel, and the output may be configured to be output by combining the output of each rotation storage device, or any arbitrary combination configuration or input/output mode can be adopted.

Embodiment 1 Wind-Activated Power Generation System

Figure 9:
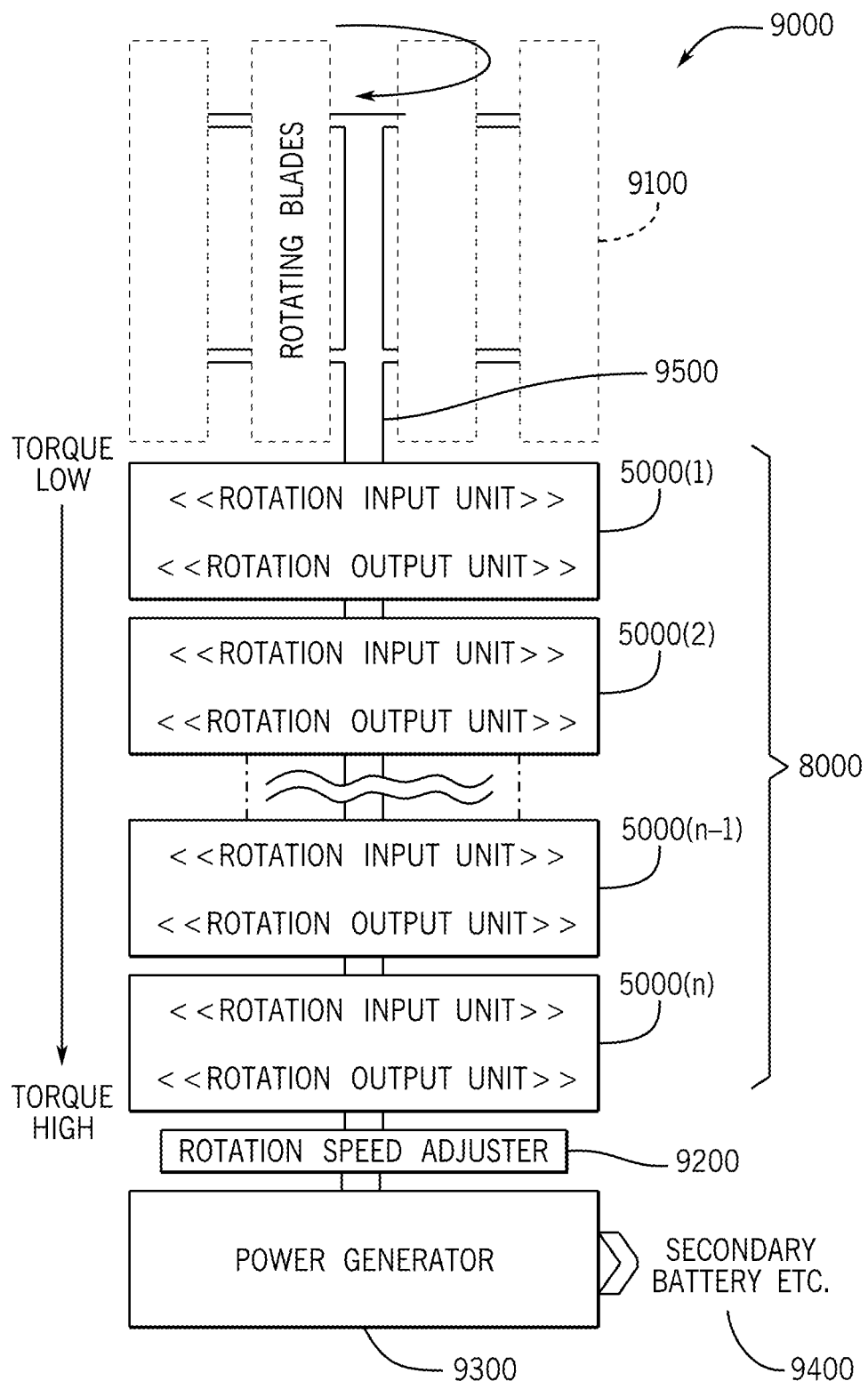
FIG. 9 is a diagram to illustrate the schematic configuration of a wind-activated power generation system according to an embodiment equipped with the rotation storage apparatus described above.

FIG. 9 is a diagram to illustrate the schematic configuration of a wind-activated power generation system 9000 according to an embodiment equipped with the rotation storage apparatus described above. The rotation storage apparatus can store any energy as mechanical energy of the urging means and can output it arbitrarily. In this embodiment, a schematic configuration of a wind-activated power generation system 9000 is shown and explained as a typical example.

As shown in FIG. 9, when a plurality of rotating blades 900 provided in the wind-activated power generation system 9000 are rotated by the wind, the rotation is input to rotation storage apparatus 8000 through rotation shaft 9500. Rotation storage apparatus 8000 is equipped with an arbitrary n number of rotation storage devices 5000(1), 5000(2), . . . , 5000(n–1), 5000(n), the configuration is not limited to the series arrangement described above and can be configured as a parallel arrangement or with an arbitrary arrangement such as the combination thereof.

The output of the last-stage rotation storage device 5000(n) arranged on the output end can be input to the rotation speed adjustment mechanism 9200, and the rotational force and rotational speed can be appropriately adjusted to match the driving force and power generation efficiency of power generator 9300. The output of the rotation speed adjustment mechanism 9200 is the drive energy for generating electric power by driving the power generator 9300, and the electric power generated by the power generator 9300 may be used directly in real-time or may be stored in the secondary battery 9400 and used later arbitrarily.

As can be understood from the above description, rotation storage apparatus 8000 functions as a buffer for driving the power generator with wind energy in the wind-activated power generation system 9000. In other words, since wind energy depends on nature, it usually changes significantly every day or every hour based on various factors such as weather, wind strength and location, and surrounding environment, and it cannot be considered as excellent from the perspective of stability.

For example, although rotating blades 9100 can be configured to rotate even when the wind power is extremely weak, usually, and it is considered that the driving force with such a weak rotational force is not adequate to operate the power generator 9300 for the generation of electricity. However, although the wind speed is extremely slow, rotating blades 9100 rotate and generate a minute amount of rotational energy, and rotation storage apparatus 8000 can store the minute amount of rotational energy. Therefore, for example, as shown in FIG. 9, along with the energy transfer to rotation storage devices 5000(1), 5000(2), . . . , 5000(n–1), 5000(n) and output end of the later stage, rotational torque or/and rotational speed that are gradually output may be increased. Specifically, for example, the thickness of flat coil spring in each of the rotation storage devices 5000(1), 5000(2), . . . , 5000(n–1), 5000(n) is gradually increased, and, for example, rotation storage device 5000(1) maybe 0.1 mm, rotation storage device 5000(2) maybe 0.15 mm, and rotation storage device 5000(3) maybe 0.2 mm.

Further, the rotation speed adjustment mechanism 9200 may not be necessarily provided, or it may be provided arbitrarily between any of the rotation storage devices 5000(1), 5000(2), . . . , 5000(n–1), 5000(n). The rotation speed adjustment mechanism 9200 may be configured as, for example, a torque converter or a transmission gear using a plurality of gears and having an arbitrary number of teeth. A lock mechanism that blocks or temporarily stops the input and output may be provided between any of the rotation storage devices 5000(1), 5000(2), . . . , 5000(n–1), 5000(n), input end, or output end. For example, electric power may not be generated during the night when the usage of electric power is low, and only the rotational force generated by wind power may be stored in a rotation storage apparatus 8000. During the day when the usage of electric power is more, then both storage of wind power energy and generation of electric power by power generator 9300 may be performed. As is clear from the facts that has already been explained, rotation storage apparatus 8000 (even individual rotation storage devices) is capable of independently performing rotational energy input and output simultaneously. Further, an optional notification means or display means for notifying the operator of the rotation amount and energy stored in rotation storage apparatus 8000 by detection with a sensor or the like or by calculations may be provided.

Embodiment 2 Wave Activated Power Generation System

FIGS. 10(*a*), 10(*b*) are diagrams to illustrate the schematic configuration of a wave activated power generation system 10000 according to an embodiment equipped with the rotation storage apparatus described above. The rotation storage apparatus can store any energy as the mechanical energy of the urging means and can output it arbitrarily. In this embodiment, a schematic configuration of wave activated power generation system 10000 is shown and explained as a typical example.

As shown in FIGS. 10(*a*), 10(*b*), when a plurality of floats 10100 included in the wave activated power generation system 10000 swing up and down (partial rotation within the range of vertical movement of the water surface) due to the waves, the rotations are transmitted to drive chain 10300 and input to rotation storage apparatus 8000 through swing shaft 10200. Rotation storage apparatus 8000, for example, is equipped with an arbitrary number of rotation storage devices 5000(1), 5000(2), 5000(3), 5000(4), 5000(5), the configuration is not limited to the series arrangement described above and can be configured as a parallel arrangement or arbitrary arrangement/connection of their combination/connection mode thereof.

The output of the last-stage rotation storage device 5000(5) arranged on the output end can be input to the rotation speed adjustment mechanism, and the rotational force and rotational speed can be appropriately adjusted to match the driving force and power generation efficiency of power generator 10400. The output of the rotation speed adjustment mechanism becomes the drive energy that drives the power generator 10400 to generate electric power, and electric power generated by the power generator 10400 may be used directly in real-time or may be stored in the secondary battery and used later arbitrarily. For example, the rotation speed adjustment mechanism may be configured to convert and adjust the rotation speed output from rotation storage device 5000(5) to constant rotation.

By configuring the swing shaft 10200 such that, for example, the drive chain 10300 is driven only with the upward swing of float 10100 and is not driven with the downward swing by the one-way bearing, drive chain 10300 is configured to be driven in only one direction. Although an arbitrary number of floats 10100 can be provided around an arbitrary periphery of floating body 10500, FIGS. 10(*a*), 10(*b*) exemplify a configuration corresponding to providing 4 each across a pair of opposing sides. In the embodiment shown in FIG. 10, the swinging force generated when a plurality of floats 10100 rise as the water level rises and descend as the water level falls is transmitted to a pair of linear drive chains 10300. As can be understood from FIGS. 10(*a*), 10(*b*), the operation of the pair of drive chains 10300 can be input to the rotation storage apparatus 8000 after the conversion adjustment of the rotation shaft by an arbitrary mechanism such as a miter gear. The floating body 10500 may be anything such as a ship, buoy or barge, which floats on the water, on which the rotation storage apparatus 8000 and power generator 10400 can be installed.

As can be understood from the above description, rotation storage apparatus 8000 functions as a buffer for driving the power generator with wave energy in the wave activated power generation system 10000. In other words, since wave energy depends on nature, it usually changes significantly every day or every hour based on various factors such as weather, wave strength and magnitude and location, and surrounding environment, and it cannot be considered as excellent from the perspective of stability. Also, the rotational driving force generated by a single standalone float 10100 is not large enough to operate the power generator.

For example, although floats 10100 can be configured to swing up and down even when the waves are extremely weak, and usually, and it is considered that the driving force with such a weak rotational force is not adequate to drive the power generator 10400 for the generation of electricity. However, although the waves are extremely weak, floats 10100 swings and generate a minute amount of rotational energy, and rotation storage apparatus 8000 can collect and store the minute amount of rotational energy. Therefore, for example, as shown in FIG. 10, along with the energy transfer to rotation storage devices 5000(1), 5000(2), and the output end of the later stage, rotational torque or/and rotational speed that are gradually output may be increased. Specifically, for example, the thickness of flat coil spring in each of the rotation storage devices 5000(1), 5000(2), . . . is gradually increased, and, for example, rotation storage device 5000(1) maybe 0.1 mm, rotation storage device 5000(2) maybe 0.15 mm, and rotation storage device 5000(3) maybe 0.2 mm.

Further, the rotation speed adjustment mechanism may not be necessarily provided, or it may be provided arbitrarily between rotation storage devices 5000(1), 5000(2), The rotation speed adjustment mechanism may be configured as, for example, a torque converter or a transmission gear using a plurality of gears and having an arbitrary number of teeth. A lock mechanism that blocks or temporarily stops the input and output may be provided between rotation storage devices 5000(1), 5000(2), input end, or output end. For example, electric power may not be generated during the night when usage of electric power is low, and only the rotational force generated by wave power may be stored in rotation storage apparatus 8000. During the day when usage of electric power is more, then both storage of wave activated power energy and generation of electric power by power generator 10400 may be performed. As is clear from the facts that has already been explained, rotation storage apparatus 8000 (even individual rotation storage devices) is capable of independently performing rotational energy input and output simultaneously. Further, an optional notification means or display means for notifying the operator of the rotation amount and energy stored in rotation storage apparatus 8000 by detection with a sensor or the like or by calculations may be provided. As shown in FIG. 10, since the rotational speeds of the pair of drive chains 10300 are different from each other, using one-way clutch bearings 10600(1), 10600(2) is preferable for each of the drive chain at the connector that transmits the rotation to the same shaft.

Embodiment 3 Hydroelectric Power Generation System

FIGS. 11(*a*), 11(*b*) are diagrams to illustrate the schematic configuration of a hydroelectric power generation system 11000 according to an embodiment equipped with the rotation storage apparatus described above. The rotation storage apparatus can store any energy as mechanical energy of the urging means and can output it arbitrarily. In this embodiment, a schematic configuration of hydroelectric power generation system 11000 is shown and explained as a typical example.

Figure 11A:
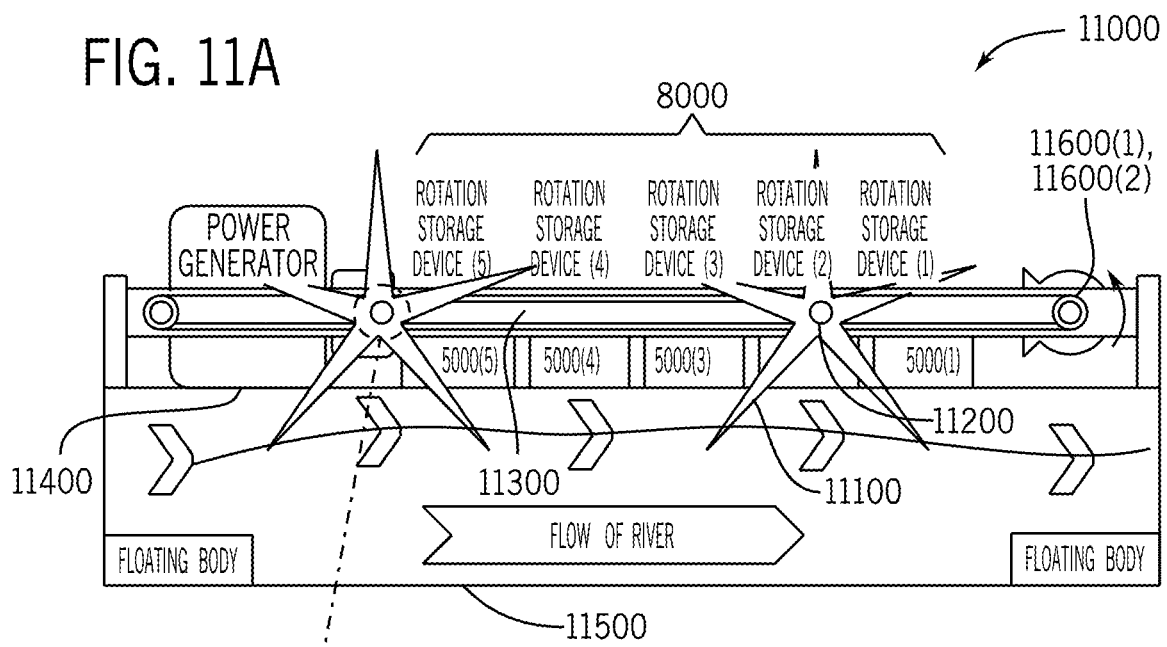
FIGS. 11(a), 11(b) are diagrams to illustrate the schematic configuration of a hydroelectric power generation system according to an embodiment equipped with the rotation storage apparatus described above.
Figure 11B:
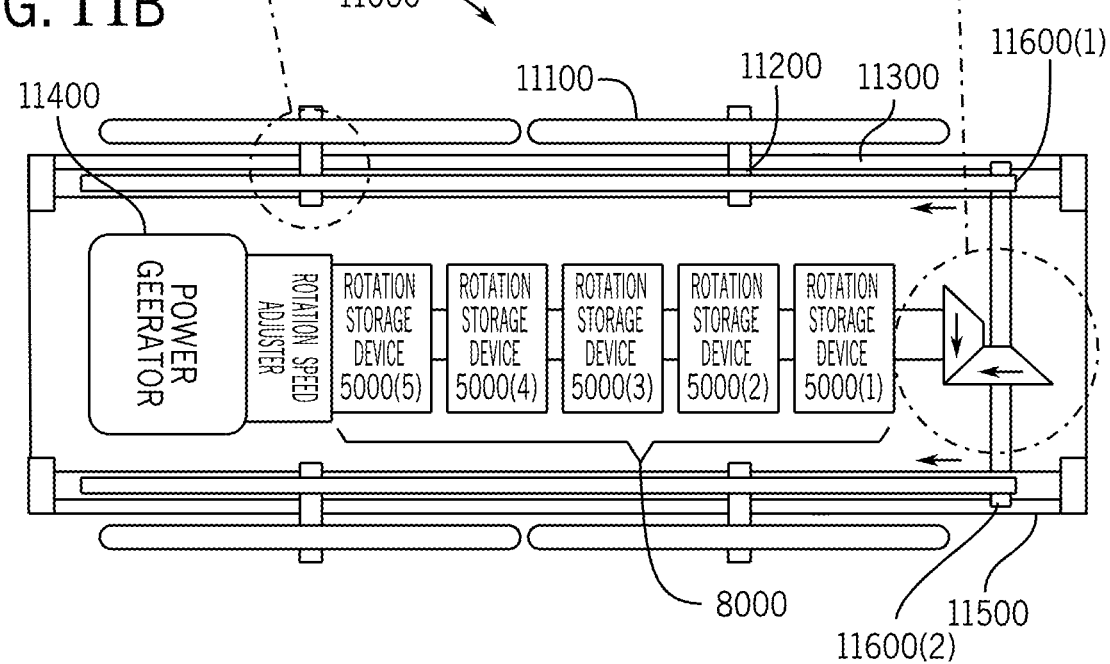

As shown in FIGS. 11(a), 11(b), when a plurality of rotating blades 11100 provided in the hydroelectric power generation system 11000 are rotated by the water flow, the rotation is transmitted to drive chain 11300 through rotation shaft 11200 and input to rotation storage apparatus 8000. Rotation storage apparatus 8000, for example, is equipped with an arbitrary number of rotation storage devices 5000 (1), 5000(2), 5000(3), 5000(4), 5000(5), the configuration is not limited to the series arrangement described above and can be configured as a parallel arrangement or arbitrary arrangement/connection of their combination/connection mode thereof.

The output of the last-stage rotation storage device 5000 (5) arranged on the output end can be input to the rotation speed adjustment mechanism, and the rotational force and rotational speed can be appropriately adjusted to match the driving force and power generation efficiency of power generator 11400. The output of the rotation speed adjustment mechanism becomes the drive energy that drives the power generator 11400 to generate electric power, and electric power generated by the power generator 11400 may be used directly in real time, or may be stored in the secondary battery and used later arbitrarily. For example, the rotation speed adjustment mechanism may be configured to convert and adjust the rotation speed output from rotation storage device 5000(5) to a constant rotation.

By configuring the rotation shaft 11200 such that, for example, the drive chain 11300 is driven only during the rotation of rotating blade 11100 in only one direction with the one-way bearing and the chain is not driven during the reverse rotation, drive chain 11300 is configured to be driven in only the same direction. Although an arbitrary number of rotating blades 11100 can be provided around an arbitrary periphery of floating body 11500, FIGS. 11(a), 11(b) exemplify a configuration corresponding to providing 2 each across a pair of opposing sides such that the flow of water can be used efficiently. In the embodiment shown in FIG. 11, the rotational force generated, for example, when a plurality of rotating blades 11100 rotate in one direction with the flow of water in a stream, is efficiently transmitted to a pair of linear drive chains 11300. As can be understood from FIGS. 11(a), 11(b), the operation of the pair of drive chains 11300 is input to rotation storage apparatus 8000 after the conversion adjustment of the rotation shaft by an arbitrary mechanism such as a miter gear. The floating body 11500 may be anything such as a ship, buoy or barge, which floats on the water, on which the rotation storage apparatus 8000 and power generator 11400 can be installed.

As can be understood from the above description, rotation storage apparatus 8000 functions as a buffer for driving the power generator with water flow energy in the hydroelectric power generation system 11000. In other words, since water flow energy depends on nature, it usually changes significantly every day or every hour based on various factors such as weather, strength and magnitude of the water flow and location, and surrounding environment, and it cannot be considered as excellent from the perspective of stability. Also, the rotational driving force generated by a single standalone rotating blade 11100 is not large enough to operate the power generator.

For example, although rotating blade 11100 can be configured to rotate even when the water flow is extremely weak, usually, and it is considered that the driving force with such a weak rotational force is not adequate to drive the power generator 11400 for the generation of electricity. However, although the wind speed is extremely slow, rotating blades 11100 rotate and generate a minute amount of rotational energy, and rotation storage apparatus 8000 can collect and store the minute amount of rotational energy. Therefore, for example, as shown in FIGS. 11(a), 11(b), along with the energy transfer to rotation storage devices 5000(1), 5000(2), and the output end of the later stage, rotational torque or/and rotational speed that are gradually output may be increased. Specifically, for example, the thickness of flat coil spring in each of the rotation storage devices 5000(1), 5000(2), ... is gradually increased, and, for example, rotation storage device 5000(1) maybe 0.1 mm, rotation storage device 5000(2) maybe 0.15 mm, and rotation storage device 5000(3) maybe 0.2 mm.

Further, the rotation speed adjustment mechanism may not be necessarily provided, or an arbitrary may be provided arbitrarily between rotation storage devices 5000(1), 5000 (2), The rotation speed adjustment mechanism may be configured as, for example, a torque converter or a transmission gear using a plurality of gears and having an arbitrary number of teeth. A lock mechanism that blocks or temporarily stops the input and output may be provided between rotation storage devices 5000(1), 5000(2), input end, or output end. For example, electric power may not be generated during the night when the usage of electric power is low, and only the rotational force generated by wave power may be stored in rotation storage apparatus 8000. During the day when the usage of electric power is more, then both storage of water flow energy and generation of electric power by power generator 11400 may be performed.

As is clear from the facts that have already been explained, rotation storage apparatus 8000 (even individual rotation storage devices) is capable of independently performing rotational energy input and output simultaneously. Further, an optional notification means or display means for notifying the operator of the rotation amount and energy stored in rotation storage apparatus 8000 by detection with a sensor or the like or by calculations may be provided. As shown in FIGS. 11(a), 11(b), since the rotational speeds of the pair of drive chains 11300 are different from each other, using one-way clutch bearings 11600(1), 11600 (2) is preferable for each of the drive chains at the connector that transmits the rotation to the same shaft.

Embodiment 4 Assist Bicycle

Figure 12A:
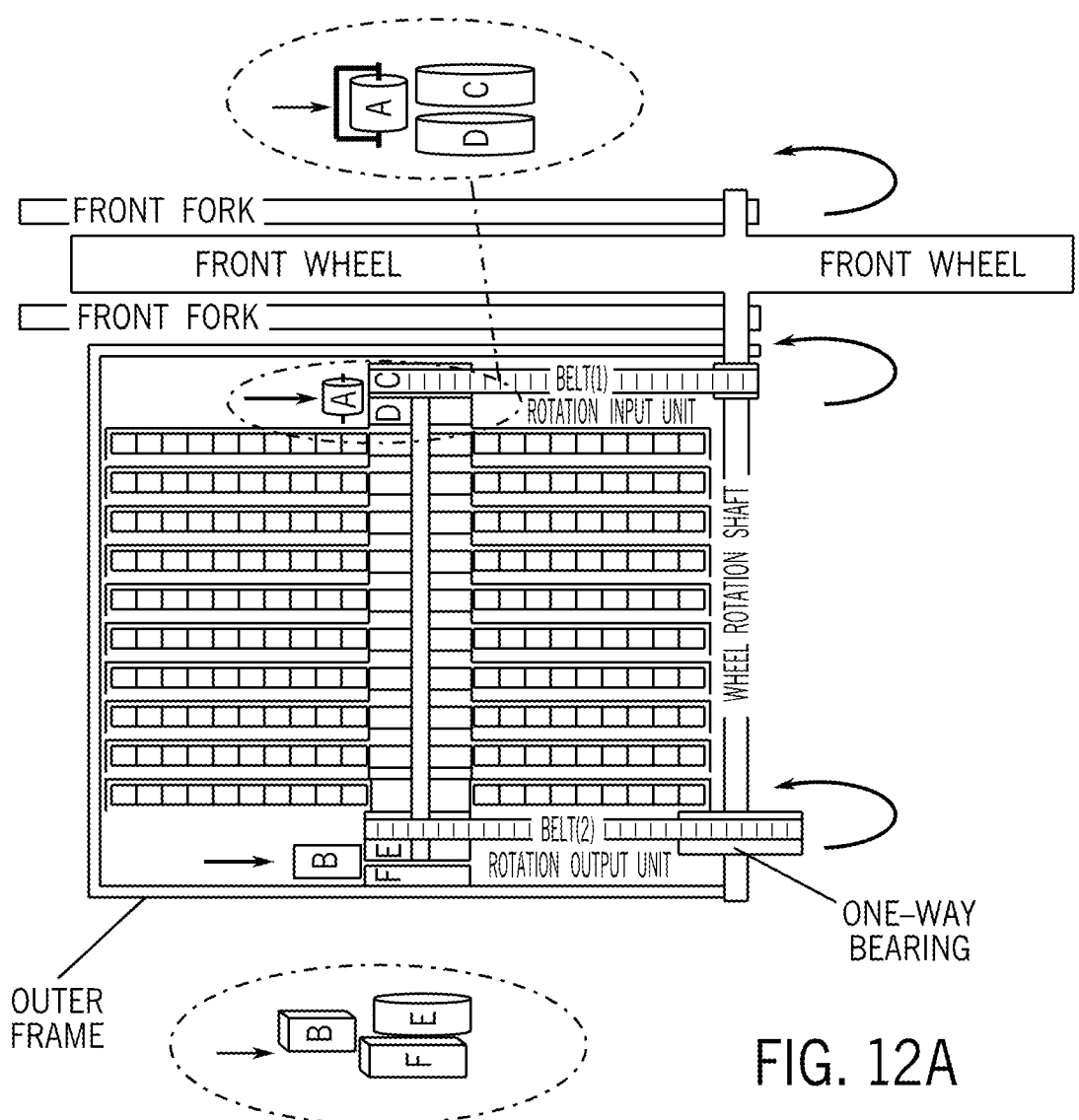
FIGS. 12(a), 12(b) are diagrams to illustrate the schematic configuration of an assisted bicycle according to an embodiment equipped with the rotation storage apparatus described above.
Figure 12B:
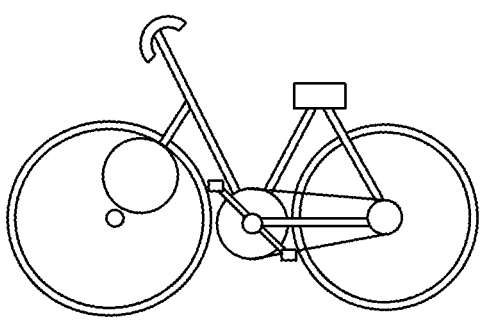

FIGS. 12(a), 12(b) are diagrams to illustrate the schematic configuration of an assisted bicycle according to an embodiment equipped with the rotation storage apparatus described above. The assisted bicycle shown in embodiment 4 stores the propulsive force of the bicycle during braking operation in the rotation storage device as rotational energy, and releases the rotational energy stored in the rotation storage device when the brake is released or/and the pedal is pressed, to assist driving the wheels.

The operation mechanism of the assisted bicycle shown in embodiment 4 is illustrated in FIG. 12 (a), and FIG. 12 (b) shows the rotation storage device (Rotary power Storage & Reinforcement System (RSRS)) of the present embodiment diagonally above the axle of the bicycle front wheel.

(a) Operation During Normal Driving

The rotational force in the forward direction is transmitted from the W unit of the wheel rotation shaft to rotating body C attached to the fixed shaft on the input side of the rotation storage device through the belt (1). Rotating body C is mounted on the fixed shaft with a normal bearing that is free to rotate in both directions and is in an idle state. Rotating body V, which rotates in conjunction with belt (2) on the output side, is mounted on the wheel rotation shaft with a one-way bearing, and normally, it is sliding.

(b) Operation During Braking

When the brake is operated, rotating body A is pressed against rotating body C and rotating body D, and the rotational force in the forward direction of rotating body C is transmitted through rotating body A to rotating body D on the rotation storage device input side.

At this time, on the output side, since pad B fixes rotating body E and fixed outer frame F in conjunction with the brake operation and prevents rotation, the rotational force is stored in the rotation storage device. At this time, when the rotation storage device capacity reaches a certain level or more and a load exceeding a certain level starts to be applied to the input side of the rotational force, the bearing of rotating body W installed on the wheel rotation shaft is devised for idle running.

(c) Operation when the Brake is Released

On the input and output sides, rotating body A and pad B are released as during normal driving. Since each flat coil spring in the rotation storage device is mounted with a one-way bearing, the rotational force stored in the rotation storage device is transmitted to the output side, and transmitted from the rotating body E on the output side through the belt (2) as a rotational force that rotates the wheel rotation shaft in the forward direction, and is used as a propulsive force for the wheels.

Here, the rotation storage device of the present invention is preferably characterized in that it further includes a housing that houses the urging means, one-way bearing, and shaft rod, and both ends of the shaft rod are respectively fixed to the housing. Since the outer ring of the one-way bearing at the output end among the one-way bearings arranged around the fixed shaft rod (fixed shaft) rotates, various ways mechanisms or structures can be adopted to take out and use the rotational force. By providing a housing that holds and houses the urging means, it is simple to connect and manage serial and parallel connections using the housing as a unit. Also, since both ends of the shaft rod can be fixed to the housing, the shaft rod is stably supported and fixed, and the one-way bearing connected to the shaft rod and urging means fixed to the one-way bearing are reliably and stably supported.

Further, the rotation storage device of the present invention is more preferably characterized in that it further includes an input rotation transmission mechanism for inputting the input rotation to the outer ring of the one-way bearing on the input end, from outside the housing. As a result, the urging means disposed of in the casing can be urged from outside the housing, and typically it is possible to wind the flat coil spring and store the rotational energy in the flat coil spring. Although the rotational force is input/output between the inner and outer rings of adjacent one-way bearings, the inner ring cannot rotate because the shaft rod fixed to the inner ring is fixed to the housing. Therefore, finally, the rotational force input from the outer ring of the one-way bearing on the input end is stored appropriately and output from the outer ring of the one-way bearing at the output end.

Further, the rotation storage device of the present invention is more preferably characterized in that the outer end of the urging means of a single unit rotation storage device on the output end is provided with an one-way bearing for output with its inner ring fixed further towards the output side of the shaft rod, and an output rotation transmission mechanism for taking the rotation of the outer ring of the one-way bearing to outside the housing. As a result, since the rotational output from the urging means can be smoothly and safely taken to outside the housing from the outer ring of the one-way bearing connected to the shaft rod as a rotational force around the shaft rod, it is preferable. The extracted rotational force can be used as various arbitrary power sources, for example, as the drive energy for various power generators. Since the energy is obtained from a mechanical power source that does not use electricity, the energy source is ecological environment-friendly irrespective of a power outage, time and place.

Further, the rotation storage apparatus of the present invention is characterized in that two or more rotation storage devices described above are disposed adjacent to each other, wherein each rotation storage device includes an input rotation transmission mechanism to input the input rotation to the outer ring of the one-way bearing on the input end from outside the housing, the outer end of the urging means of a single unit rotation storage device on the output end is provided with an one-way bearing for output with its inner ring fixed further towards output side of the shaft rod and is further provided with an output rotation transmission mechanism for taking the rotation of the outer ring of the one-way bearing for output to the outside of the housing, with a configuration connecting the input rotation transmission mechanism of one rotation storage device with the output rotation transmission mechanism of the other rotation storage device. Thereby, it becomes possible to connect an arbitrary number of a plurality of rotation storage devices in parallel or in series. Since the stored rotational energy is further increased by connecting a plurality of rotation storage devices, various devices that can be operated for a longer time or devices utilizing a larger torque output may be configured Although the connection method is preferably a plurality of arbitrary connections in series, a plurality of connections may be made in parallel based on the availability of space. Further, the input rotation transmission mechanism of one rotation storage device and the output rotation transmission mechanism of the other rotation storage device can be connected, for example, through gears of different sizes, various gears, drive transmission belt and chain, or the like.

Further, the wind-activated power generation system of the present invention is characterized by the rotating blades that rotate due to the force of the wind, the rotation storage device described above to which the rotational force of the rotating blades is input, and a power generator that generates electricity using the output of the rotation storage apparatus as a power source. Irrespective of the days when the wind is strong or weak, as long as the rotating blades are rotating, the rotational energy can be stored in the rotation storage apparatus even if the rotational power is minute and not sufficient directly to operate the power generator. Stable operations can be carried out with a constant rotational force that is sufficient as rotational energy for the power generator to work with the output from the rotation storage apparatus. In other words, the rotation storage apparatus can function as a cushion against temporal variations and magnitude variations because of natural energy and can smoothly and stably output energy at a constant output. Even when the input is a weak force that is stored for a long time, a large amount of energy can be output for a desired time, just like the so-called principle of levers.

The wind-activated power generation system of the present invention is more preferably characterized in that the output torque of each rotation storage device of the rotation storage apparatus increases towards the output. A torque converter gear may be installed between the rotation storage devices, and a flat coil spring (plate spring), which is a typical example of an urging means, may be provided with the thickness increasing from the input to the output side. In other words, since wind, which is a natural form of energy, is used as the input, it is generally not stable and input variations are significant. On the other hand, power generators and generator devices generally require stable dynamic energy of a certain magnitude or more. For this reason, the rotation storage apparatus of the present invention can be used to eliminate the temporal energy imbalance between input and output. Also, by storing even minute inputs over a long duration, energy conversion and smoothing that is required for sufficient output of operating energy for a power generator becomes possible.

Also, the wind-activated power generation system of the present invention is more preferably characterized in that the urging means is a flat coil spring, and the flat coil spring of each rotation storage device is configured such that its thickness increases towards the output. Even if the spring thickness of one flat coil spring installed in a single unit rotation storage device, or a plurality of flat coil springs installed in a rotation storage device has the same spring thickness, it is preferable that subsequently connected rotation storage devices towards the output have a spring thickness that is thicker than the preceding ones. As a result, it is possible to securely store a large amount of the weak force input and/or the long-time input of natural energy in the rotation storage apparatus and output it as a larger torque or rotational force. For this reason, it is preferable that a rotational force converter, for example, such as a torque converter is installed between each of the connected rotation storage devices.

To explain metaphorically from another perspective, the hand-wound spring, which is the power source of the old hand-wound flat coil spring watch, is wound with a relatively large human hand to store the rotational force (so-called "winding") and is configured to output a small force necessary and sufficient to operate the clock hands over a long period of time, and the energy flow according to one aspect of the present invention can be considered to be exactly the opposite. In other words, the input of a small quantity of energy over a long time can be output as a large output. For example, the configuration can be such that the rotation storage device disposed closest to the input side has an input of 100 revolutions, the rotation storage device connected next stores 75 revolutions but as a larger force, and the next connected rotation storage device stores 50 revolutions storing as a even larger output.

The wave activated power generation system of the present invention is characterized by a floating body that floats on water and is equipped with a plurality of floats that move up and down with the force of waves, a plurality of one-way bearings for wave activated power generation, each of which pivotally support the up-down movement of a plurality of floats respectively and transmit as a rotational force, a rotation belt to which the rotational force in the same direction as the one-way bearings for wave activated power generation is transmitted, the rotation storage apparatus described above to which the rotational force of the rotation belt is input, and a power generator that generates electricity using the output of the rotation storage apparatus as a power source.

Thus, if anyone of the plurality of floats moves upward with the force of buoyancy due to waves, the upward movement is applied to the belt and the rotational input is stored in the rotation storage apparatus. If a plurality of floats moves upward together, their forces overlap so that the driving torque of the belt transmitted is higher and stable. For example, a configuration in which the floats are installed on both sides of the floating body so that power can be transmitted to the belt more reliably is preferred.

Irrespective of the time when the waves are strong or weak, as long as the belt chains are rotating, the rotational energy can be stored in the rotation storage apparatus even if the rotation power is minute and not sufficient to directly operate the power generator. Stable operations can also be carried out with a constant rotational force that is sufficient as rotational energy for the power generator to work with the output from the rotation storage apparatus. In other words, the rotation storage apparatus can function as a cushion against temporal variations and magnitude variations because of natural energy and can smoothly and stably output energy at a constant output. Even when the input is a weak force that is stored for a long time, a large amount of energy can be output for a desired time, just like the so-called principle of levers.

The wave activated power generation system of the present invention is more preferably characterized in that the output torque of each rotation storage device of the rotation storage apparatus increases towards the output. A torque converter gear may be installed between the rotation storage devices, and/or a flat coil spring (plate spring), which is a typical example of an urging means, may be provided with the thickness increasing from the input to the output side. In other words, since waves, which is a natural form of energy, is used as the input, it is generally not stable and input variations are significant. On the other hand, power generators and generator devices generally require stable dynamic energy of a certain magnitude or more. For this reason, the rotation storage apparatus of the present invention can be used to eliminate the temporal energy imbalance between input and output. Also, by storing even minute inputs over a long duration, energy conversion and smoothing that is required for sufficient output of operating energy for a power generator becomes possible.

Also, the wave activated power generation system of the present invention is more preferably characterized in that the urging means is a flat coil spring, and the flat coil spring of each rotation storage device is configured such that its thickness increases towards the output. Even if the spring thickness of one flat coil spring installed in a single unit rotation storage device, or a plurality of flat coil springs installed in a rotation storage device are configured to have the same spring thickness, it is preferable that subsequently connected rotation storage devices towards the output have a spring thickness that is thicker than the preceding ones. As a result, it is possible to securely store a large amount of the weak force input and/or the long-time input of natural energy in the rotation storage apparatus and output it as a larger torque or rotational force. For this reason, it is preferable that a rotational force converter, for example, such as a torque converter is installed between each of the connected rotation storage devices. A torque converter can also convert, for example, the energy of 10 revolutions of a small rotational force (10 revolutions equivalent of a thin plate spring) to the energy of 2 revolutions of a large rotational force (10 revolutions equivalent of a thick plate spring).

The hydroelectric power generation system of the present invention is characterized by a floating body that floats on water and is equipped with a plurality of rotating blades that rotates with the flow of water, a plurality of one-way bearings for hydroelectric power generation, each of which pivotally support and transmit the rotational motion of a plurality of rotating blades respectively, a rotation belt to which the rotational force in the same direction as the plurality of one-way bearings for hydroelectric power generation is transmitted, the rotation storage apparatus described above to which the rotational force of the rotation belt is input, and a power generator that generates electricity using the output of the rotation storage apparatus as a power source.

Thus, if any one of the plurality of the rotating blades is rotated by the force of the flowing water, the rotational force is applied to the belt chain and the rotational input is stored in the rotation storage apparatus. If a plurality of rotating blades rotates together, their forces overlap so that the driving torque of the belt chain transmitted is higher and stable. For example, a configuration in which the rotating blades are installed on both sides of the floating body so that power can be transmitted to the belt more reliably is preferred.

Irrespective of the time/day/location where the flow of water is strong or weak, as long as the belt chains are rotating, the rotational energy can be stored in the rotation storage apparatus even if the blade rotation power due to minute flow of water is not sufficient to directly operate the power generator. Stable output operations also can be carried out with a constant rotational force that is sufficient as rotational energy for the power generator to work with the output from the rotation storage apparatus. In other words, the rotation storage apparatus can function as a cushion against temporal input variations and input magnitude variations because of natural energy and can smoothly and stably output energy at a constant output. Even when the input is a weak force that is stored for a long time, a more significant amount of energy can be output for a desired time, just like the so-called principle of levers.

The hydroelectric power generation system of the present invention is more preferably characterized in that the output torque of each rotation storage device of the rotation storage apparatus increases towards the output. A torque converter gear may be installed between the rotation storage devices, and a flat coil spring (plate spring), which is a typical example of an urging means, may be provided with the thickness increasing from the input to the output side. In other words, since the flow of water, which is a natural form of energy, is used as the input, it is generally not stable and input variations are significant. On the other hand, power generators and generator devices generally require stable dynamic energy of a certain magnitude or more. For this reason, the rotation storage apparatus of the present invention can be used to eliminate the temporal energy imbalance between input and output. Also, by storing even minute inputs over a long duration, energy conversion and smoothing that is required for sufficient output of operating energy for a power generator becomes possible.

Also, the hydroelectric power generation system of the present invention is more preferably characterized in that the urging means is a flat coil spring, and the flat coil spring of each rotation storage device is configured such that its thickness increases towards the output. Even if the spring thickness of one flat coil spring installed in a single unit rotation storage device, or a plurality of flat coil springs installed in a rotation storage device are configured to have the same spring thickness, it is preferable that subsequently connected rotation storage devices towards the output have a spring thickness that is thicker than the preceding ones.

As a result, it is possible to securely store a large amount of the weak force input and/or the long-time input of natural energy in the rotation storage apparatus and output it as a larger torque or rotational force. For this reason, it is preferable that a rotational force converter, for example, such as a torque converter is installed between each of the connected rotation storage devices. A torque converter can also convert, for example, the energy of 10 revolutions of a small rotational force (10 revolutions equivalent of a thin plate spring) to the energy of 2 revolutions of a large rotational force (10 revolutions equivalent of a thick plate spring).

The rotation storage device described above is not limited to the description in the embodiment, and the configuration, structure and material can be changed or arranged appropriately within the objective of the present invention and within the scope evident to those skilled in the art.

INDUSTRIAL APPLICABILITY

The present invention can be suitably employed as a mechanical structure that stores mechanical power and outputs it arbitrarily as required, especially in bicycles or wind power generation.

REFERENCE SIGNS LIST

1000 rotation storage device, 1100 flat coil spring, 1110 outer end, 1120 inner end, 1200 one-way bearing, 1210 outer ring, 1220 inner ring, 1300 shaft rod.

What is claimed is:
1. A rotation storage device comprising:
a plurality of unit rotation storage devices each equipped with:
  an urging means that urges a rotational force and comprises an inner end and an outer end; and
  a one-way bearing comprising an inner ring and an outer ring, wherein the inner end of the urging means is fixed to the outer ring of the one-way bearing thereof; and
wherein:
the outer rings of the one-way bearings of the plurality of unit rotation storage devices are connected to one another via respective urging means of the plurality of unit rotation storage devices;
the outer end of each of the urging means of the plurality of unit rotation storage devices is connected to the inner end of the urging means of an adjacent one of the plurality of unit rotation storage device;
a rotational force is output between the inner ring and the outer ring of the one-way bearings;
while the outer end of each urging means is fixed to the inner end of the urging means arranged adjacently on an output side, the inner end of each urging means is fixed to the outer ring of a respectively provided one-way bearing;
a shaft core rod is connected to the inner rings of the one-way bearings and is unrotatably fixed; and
the outer rings of the one-way bearings output a rotational force.

2. The rotation storage device according to claim 1, wherein the plurality of unit rotation storage devices are successively arranged so as to be coaxially positioned.

3. The rotation storage device according to claim 1, wherein the urging means of each of the plurality of unit rotation storage devices is a spring.

4. The rotation storage device according to claim 3, wherein the spring is a spiral spring.

5. The rotation storage device according to claim 1, wherein the urging means of the plurality of unit rotation storage devices are urging means whose rotational force progressively increases toward the output side.

6. The rotation storage device according to claim 1, wherein the urging means of the plurality of unit rotation storage devices are urging means whose characteristics are identical.

7. The rotation storage device according to claim 1, wherein the duration over which a rotational force can be output from the rotation storage device is greater than the duration over which an individual unit rotation storage device can output a rotational force.

8. A generator equipped with the rotation storage device according to claim 1.

9. The generator according to claim 8, characterised in that the generator is a wind power generator.

10. A bicycle characterised in that it is equipped with the rotation storage device according to claim 1.

11. The rotation storage device according to claim 1, further comprising an enclosure that holds the urging means, the one-way bearings, and the shaft core rod; and
input and output ends of the shaft core rod are fixed to the enclosure.

12. The rotation storage device according to claim 11, further comprising an input rotation transmission mechanism for inputting, from outside the enclosure, an input rotation to the outer ring of the one-way bearing of the unit rotation storage device at an input side.

13. The rotation storage device according to claim 11, further comprising:
a one-way bearing for output, to the outer ring of which is fixed the outer end of the urging means of the unit rotation storage device at the output side, and whose inner ring is fixed further to the output end of the shaft core rod; and
an output rotation transmission mechanism for extracting, to the outside of the enclosure, the rotation of the outer ring of the one-way bearing for output.

14. A rotation storage apparatus in which at least two of the rotation storage devices according to claim 11 are adjacently arranged, said rotation storage devices further comprising:
an input rotation transmission mechanism for inputting, from outside the enclosure, an input rotation to the outer ring of the one-way bearing of the unit rotation storage device at an input side;
a one-way bearing for output, to the outer ring of which is fixed the outer end of the urging means of the unit rotation storage device at the output side, and whose inner ring is fixed further to the output end of the shaft core rod; and
an output rotation transmission mechanism for extracting, to the outside of the enclosure, the rotation of the outer ring of the one-way bearing for output; and
wherein the rotation storage apparatus has a configuration in which the output rotation transmission mechanism of one rotation storage device is connected to the input rotation transmission mechanism of another, adjacent, rotation storage device.

15. A wind power generation system characterised in that it comprises a rotating blade rotated by the force of wind; a rotation storage apparatus according to claim 14 to which is input the rotational force of the rotating blade; and a generator which generates electric power using the output of the rotation storage apparatus as a motive power source.

16. The wind power generation system according to claim 15, characterised in that the output torque of the rotation storage devices of the rotation storage apparatus increases toward the output side.

17. The wind power generation system according to claim 16, characterised in that the urging means is a spiral spring, and the thickness of the spiral springs of the rotation storage devices is made thicker toward the output side.

18. A wave power generation system characterised in that it comprises a floating body which floats on water and on which is mounted:
a plurality of floats that are moved up and down by the force of waves;
a plurality of one-way bearings for wave power generation, each pivotably supporting the vertical movement of the plurality of floats and transmitting this as a rotational force;
a rotary belt to which is transmitted the unidirectional rotational force of the plurality of one-way bearings for wave power generation;
the rotation storage apparatus according to claim 14, to which is input the rotational force of the rotary belt; and
a generator which generates electric power using the output of the rotation storage apparatus as a motive power source.

19. The wave power generation system according to claim 18, characterised in that the output torque of the rotation storage devices of the rotation storage apparatus increases toward the output side.

20. The wave power generation system according to claim 19, characterised in that the urging means is a spiral spring, and the thickness of the spiral springs of the rotation storage devices is made thicker toward the output side.

21. A water power generation system comprising a floating body which floats on water, the floating body having mounted thereon:
a plurality of rotating blades that are rotated by a water current;
a plurality of one-way bearings for water power generation, each pivotably supporting and transmitting the rotational movement of the plurality of rotating blades;
a rotary belt to which is transmitted the unidirectional rotational force of the plurality of one-way bearings for water power generation;
the rotation storage apparatus according to claim 14, to which is input the rotational force of the rotary belt; and
a generator which generates electric power using the output of the rotation storage apparatus as a motive power source.

22. The water power generation system according to claim 21, wherein the output torque of the rotation storage devices of the rotation storage apparatus increases toward the output side.

23. The water power generation system according to claim 22, wherein the urging means is a spiral spring, and the thickness of the spiral springs of the rotation storage devices is made thicker toward the output side.

* * * * *